INVENTOR.
WILLIAM J. BURRIS
JOSEPH J. CODICHINI
RICHARD E. HAYFORD
CHARLES L. HUBER

BY

ATTORNEY

INVENTOR.
WILLIAM J. BURRIS
JOSEPH J. CODICHINI
RICHARD E. HAYFORD
CHARLES L. HUBER

BY ATTORNEY

INVENTOR.
WILLIAM J. BURRIS
JOSEPH J. CODICHINI
RICHARD E. HAYFORD
CHARLES L. HUBER

ATTORNEY

INVENTOR.
WILLIAM J. BURRIS
JOSEPH J. CODICHINI
RICHARD E. HAYFORD
CHARLES L. HUBER
BY
ATTORNEY

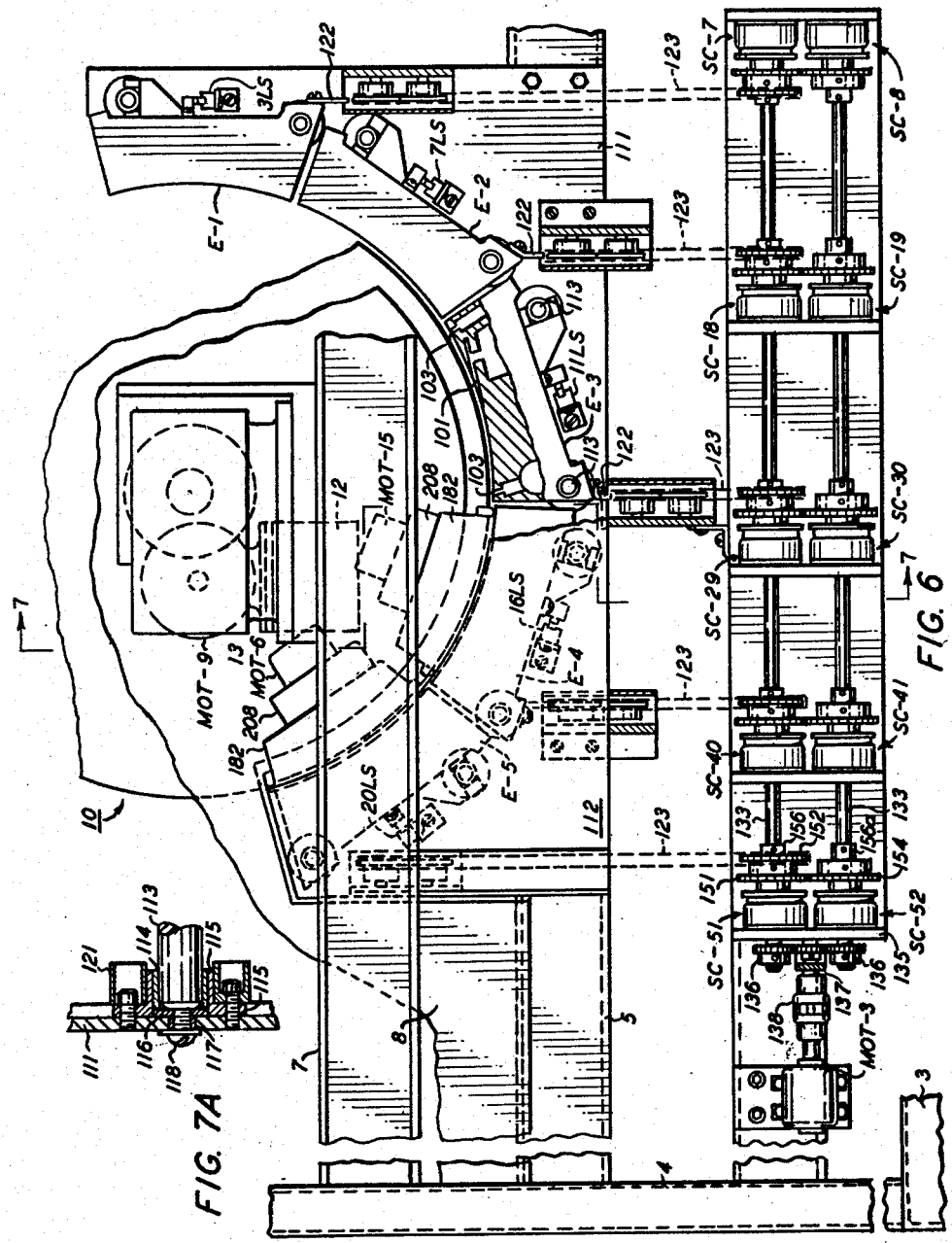

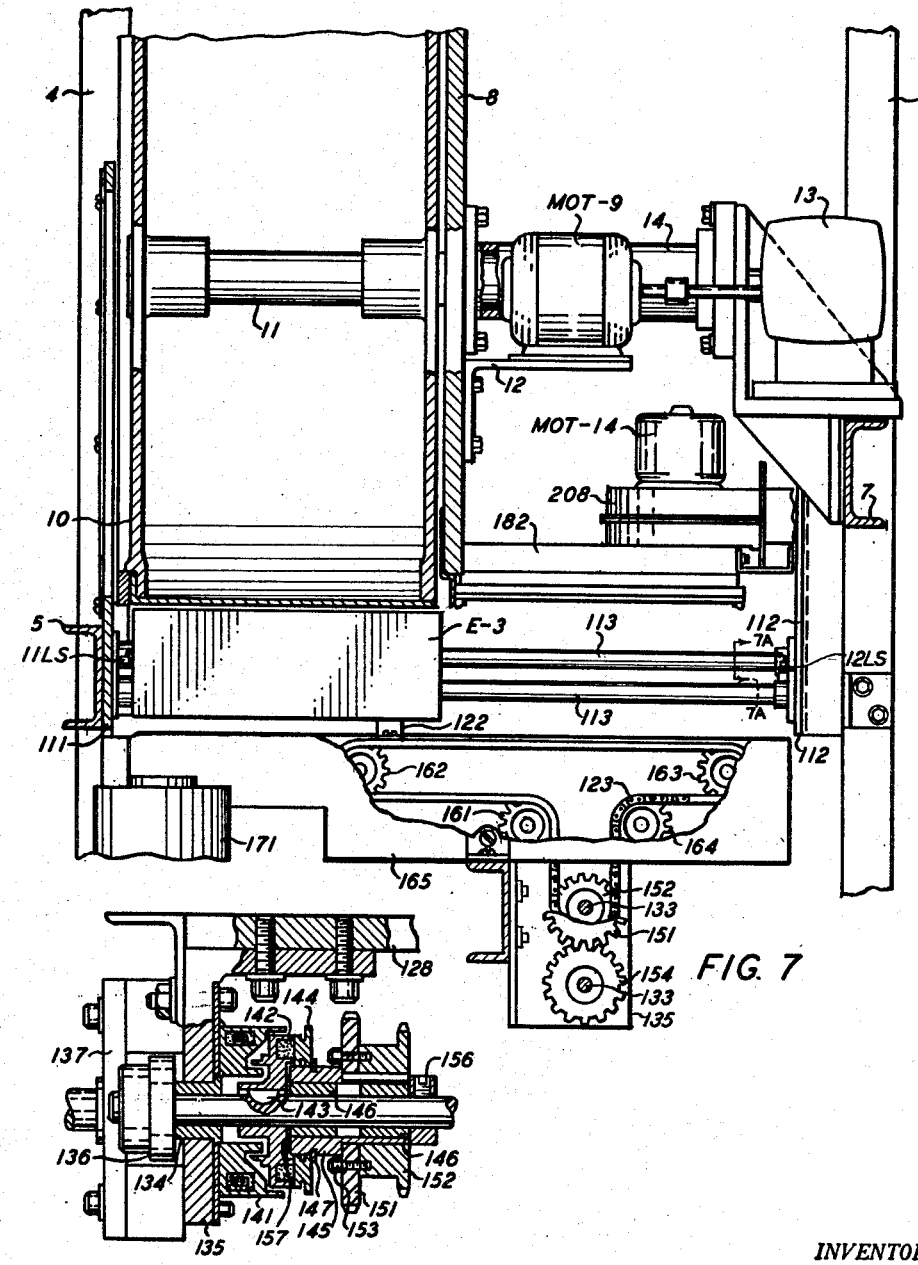

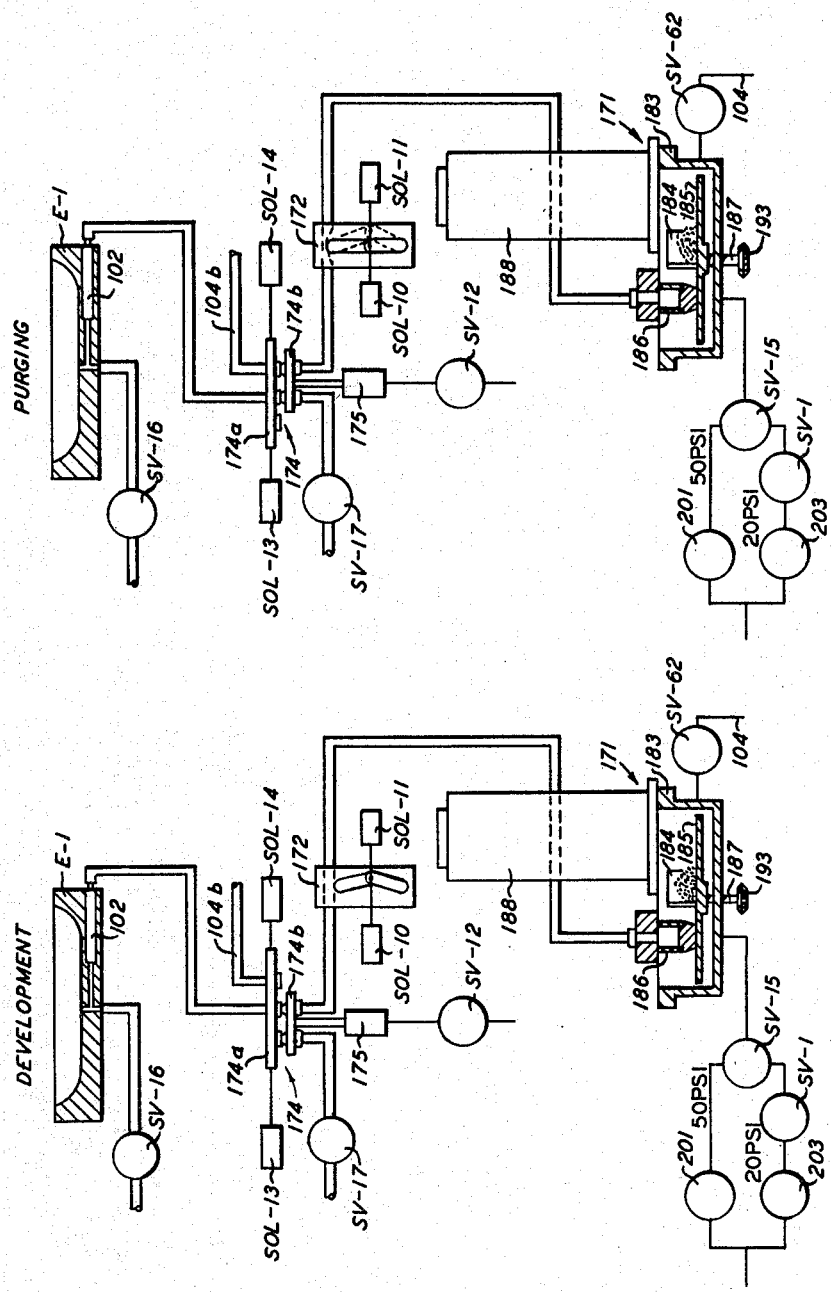

INVENTOR.
WILLIAM J. BURRIS
JOSEPH J. CODICHINI
RICHARD E. HAYFORD
CHARLES L. HUBER
BY
ATTORNEY

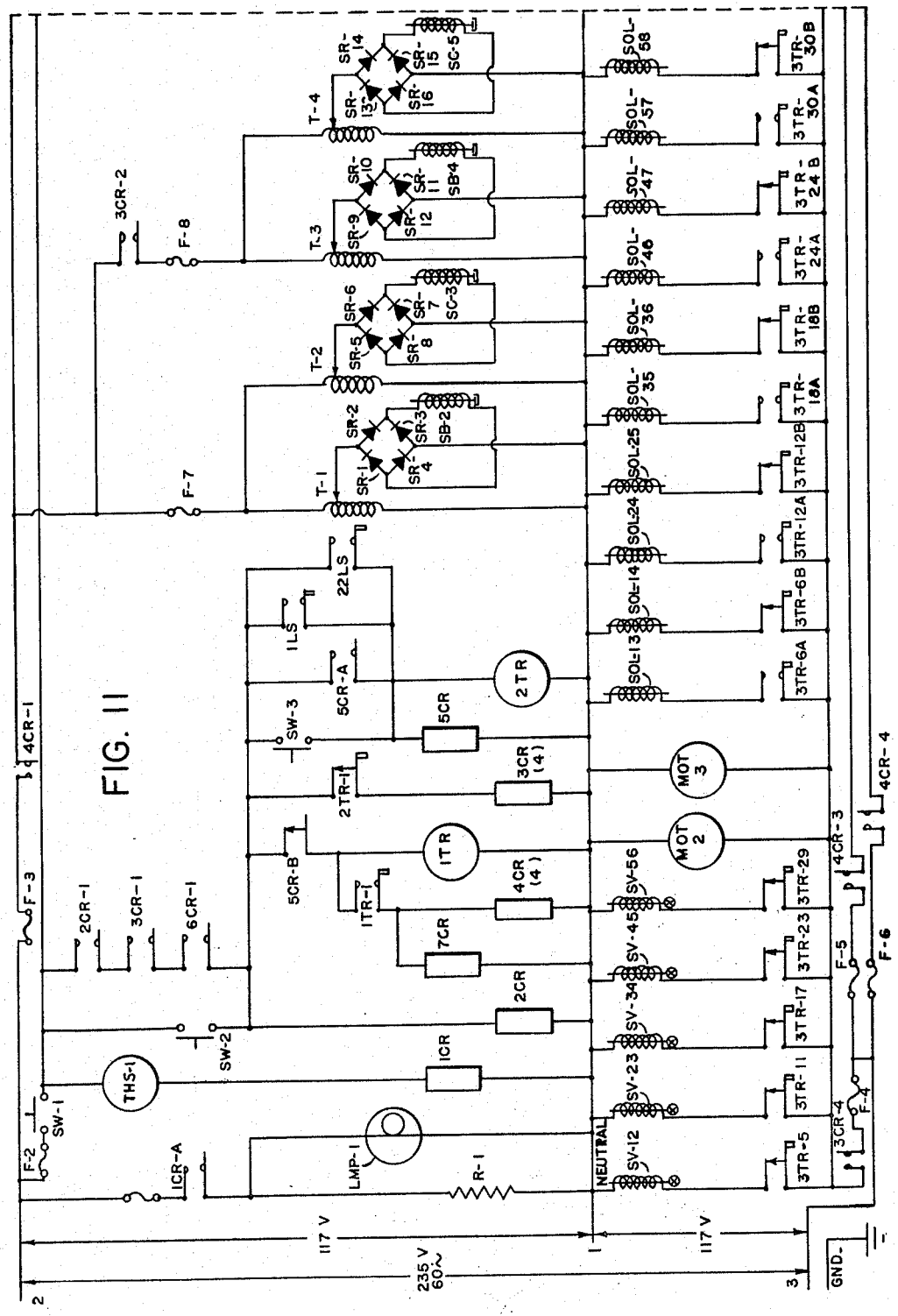

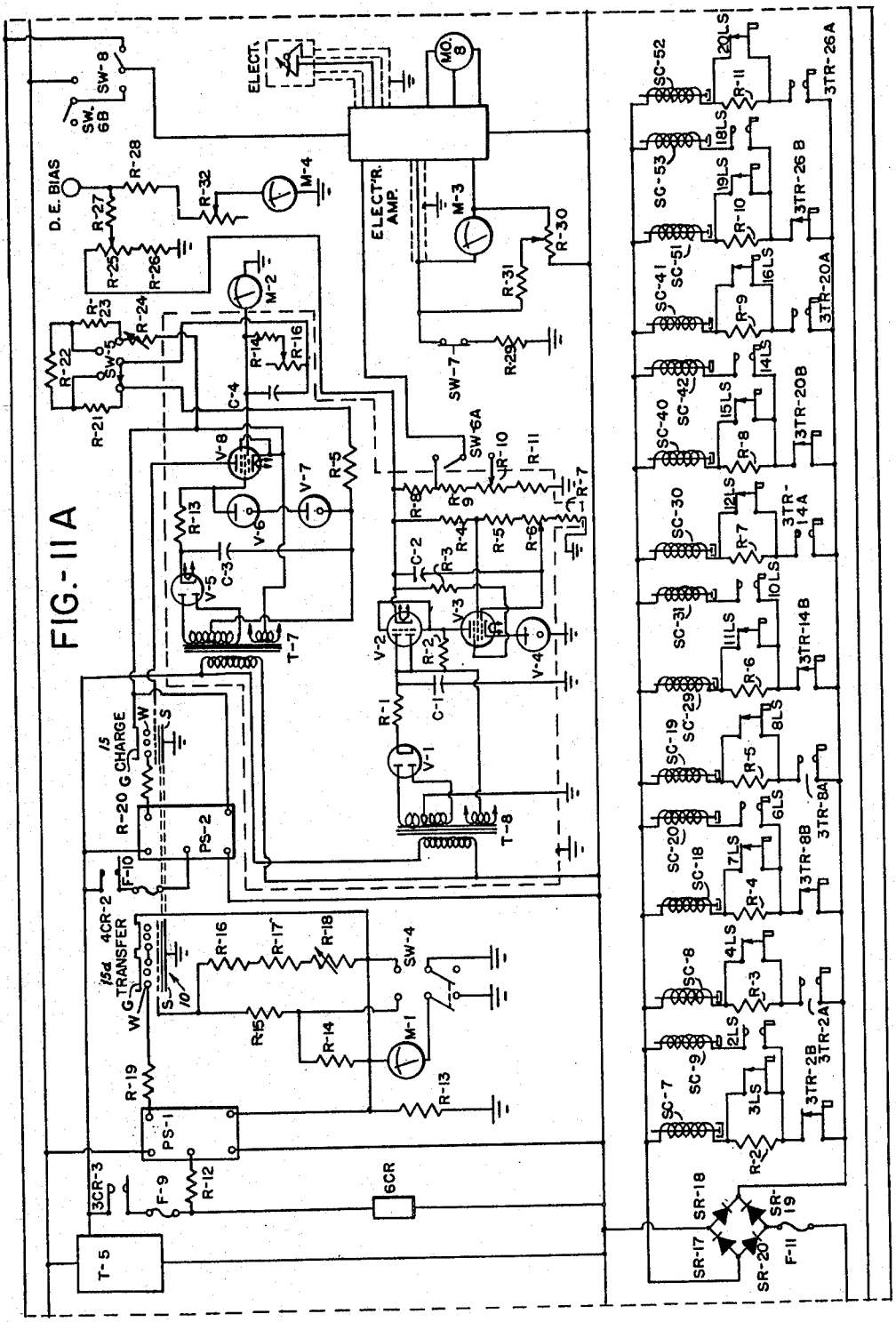

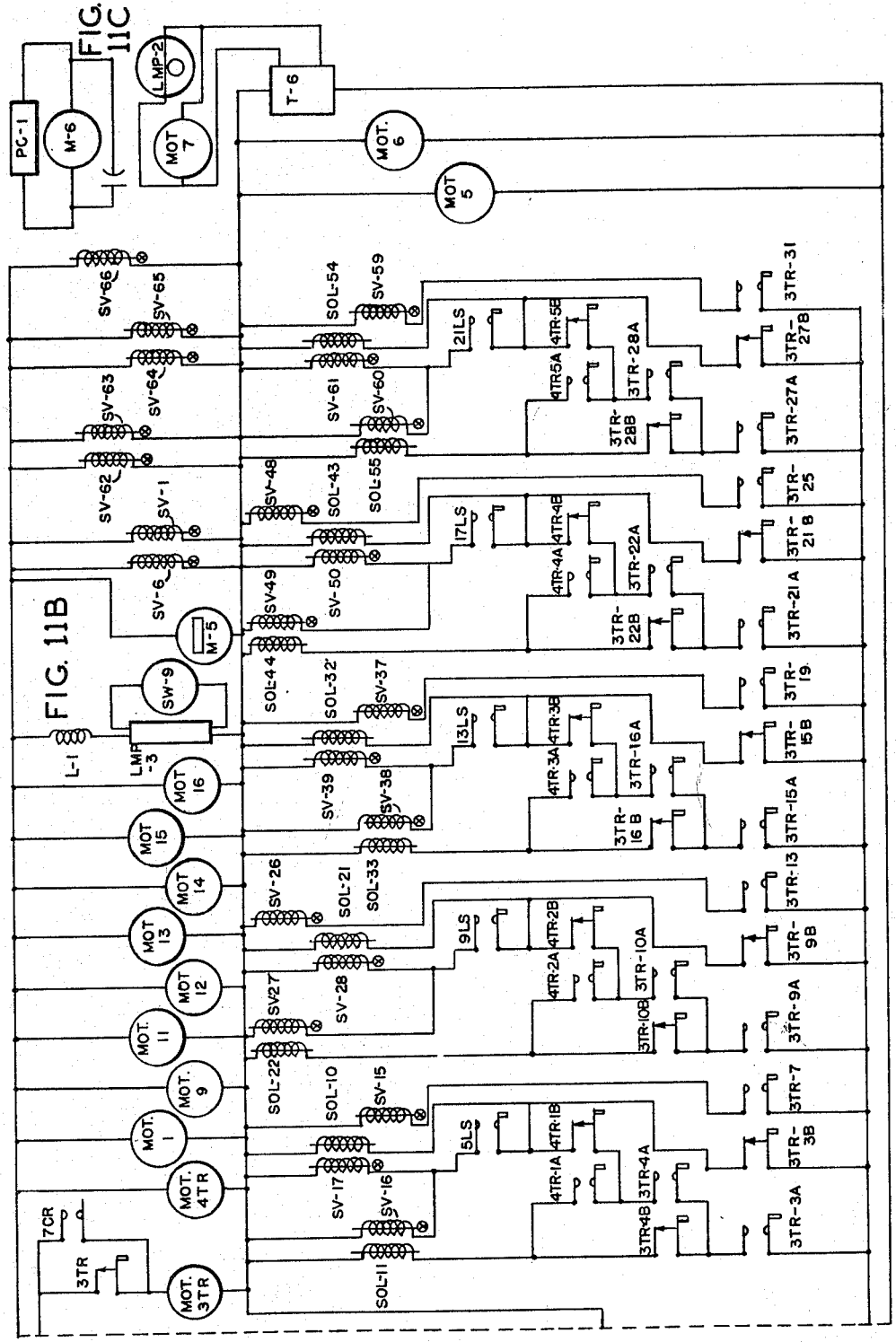

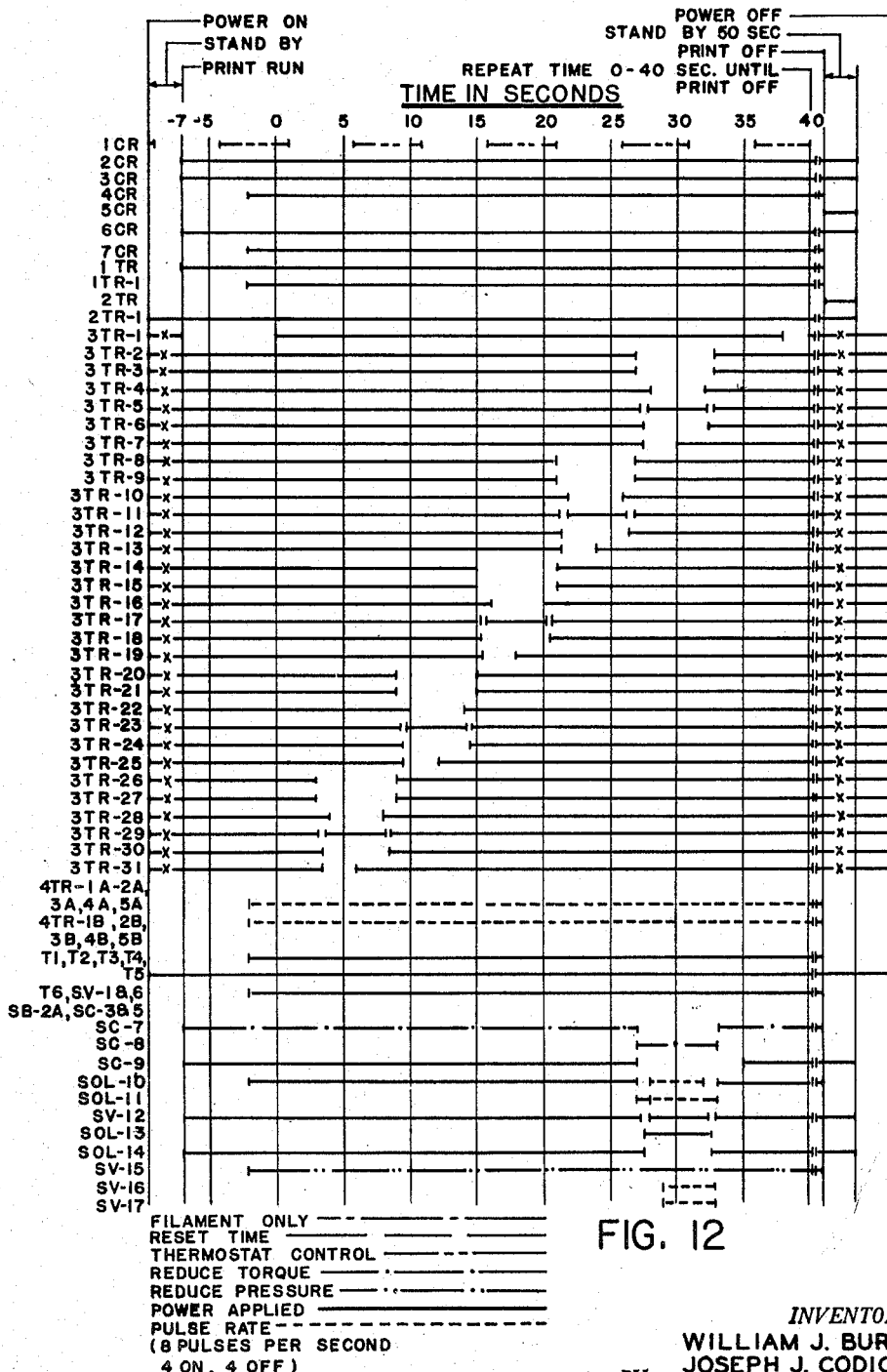

May 5, 1964 — W. J. BURRIS ETAL — 3,131,617
XEROGRAPHIC REPRODUCING APPARATUS
Filed Oct. 6, 1960

INVENTOR.
WILLIAM J. BURRIS
JOSEPH J. CODICHINI
RICHARD E. HAYFORD
CHARLES L. HUBER
BY
ATTORNEY

United States Patent Office 3,131,617
Patented May 5, 1964

3,131,617
XEROGRAPHIC REPRODUCING APPARATUS
William James Burris, Warsaw, Joseph J. Codichini, Fairport, Richard E. Hayford, Pittsford, and Charles L. Huber, Byron, N.Y., assignors to Xerox Corporation, a corporation of New York
Filed Oct. 6, 1960, Ser. No. 60,915
4 Claims. (Cl. 95—1.7)

This invention relates to xerography and, in particular, to an improved xerographic reproducing apparatus.

More specifically, the invention relates to an improved automatic xerographic contact printer for use in producing xerographic continuous-tone reproductions from photographic negatives, negative or positive transparencies, by contact printing.

Continuous photographic printers of the type adapted to continuously feed a negative film strip and a strip of sensitized printing paper in intimate contact with each other past a printing gate to expose the paper to light passing through the negative to produce a latent image thereon, which upon development by the usual photographic developing process to produce a print, are well known and in wide commercial use. However, in many applications it is impractical to use these photographic contact printers since the usual chemical processes and cycle in making contact prints on roll photographic paper are time consuming and of course require the use of special chemicals and sensitized paper.

It is, therefore, the principal object of this invention to improve xerographic reproducing apparatus for making continuous-tone reproductions through contact exposure to a continuous strip of photographic film.

Another object of this invention is to improve xerographic reproducing apparatus so that rapid modifications of contrast and exposure can be made continuously while the machine is in operation to obtain continuous-tone prints having any degree of contrast as desired.

These and other objects of the invention are attained by means of a charging device, a contact exposure mechanism including a film transport system, a developer mechanism, a transfer device, a paper transport system and fuser mechanism, and a drum cleaner, all operatively positioned around a rotatably journaled xerographic drum.

For a better understanding of the invention as well as other objects and features thereof, reference is had to the following detailed description of the invention to be read in connection with the accompanying drawings, wherein:

FIG. 6 is a rear view of the development apparatus of the machine with parts broken away to show details of construction;

FIG. 7 is a sectional view of the development apparatus taken along line 7—7 of FIG. 6;

FIG. 7a is an enlarged sectional view of support elements for the transverse rails supporting the development electrodes;

FIG. 8 is an enlarged sectional view of a development electrode drive clutch;

FIG. 9 is a schematic pneumatic circuit diagram of a development electrode and elements cooperating therewith in position to effect development;

FIG. 9a is a schematic pneumatic circuit diagram illustrating a development electrode and elements cooperating therewith in position to effect purging;

Figure 12:
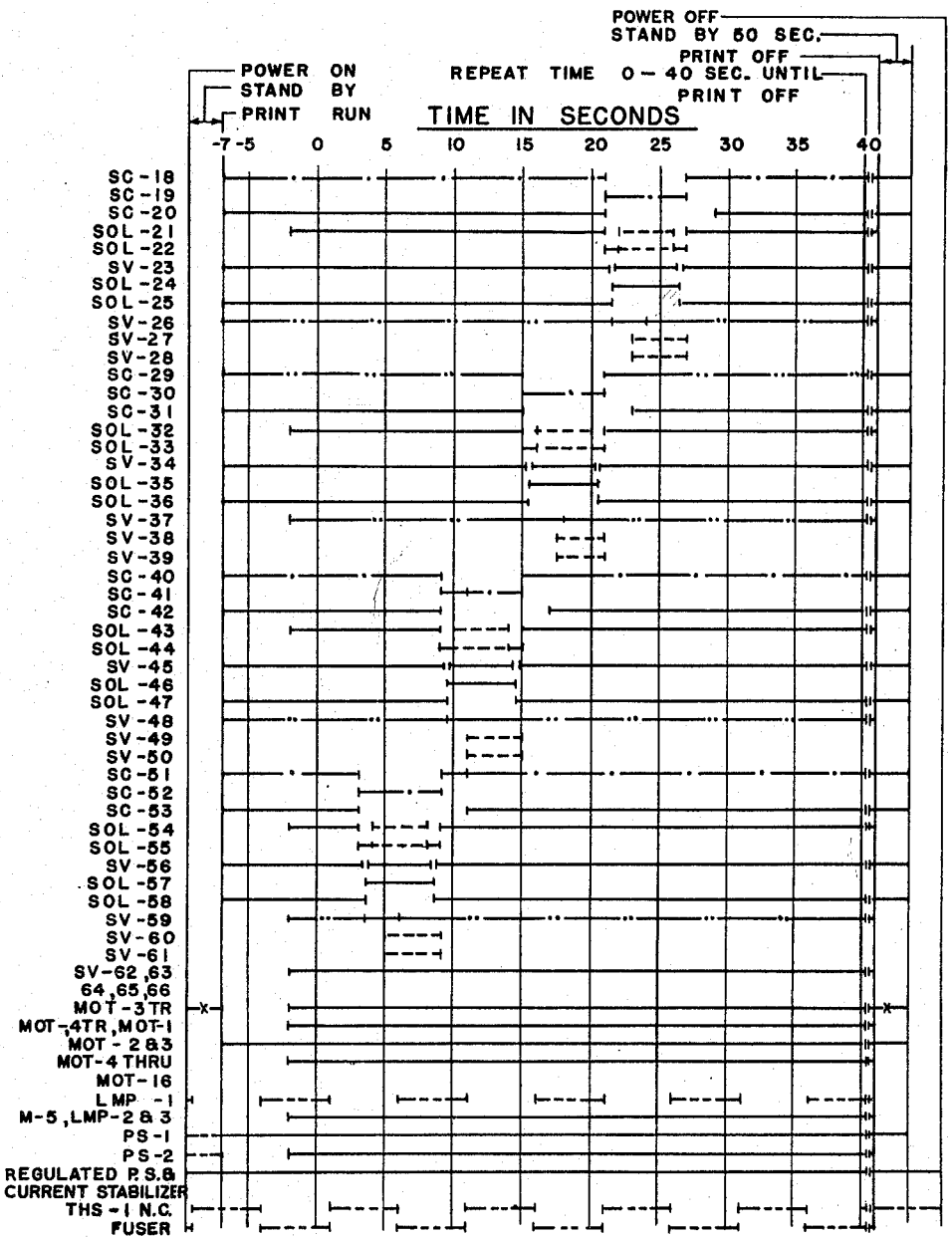

FIGS. 11, 11a, 11b, and 11c are schematic electrical wiring diagrams of the machine; and FIGS. 12 and 12a are sequence of operation charts of the machine.

Figure 1:
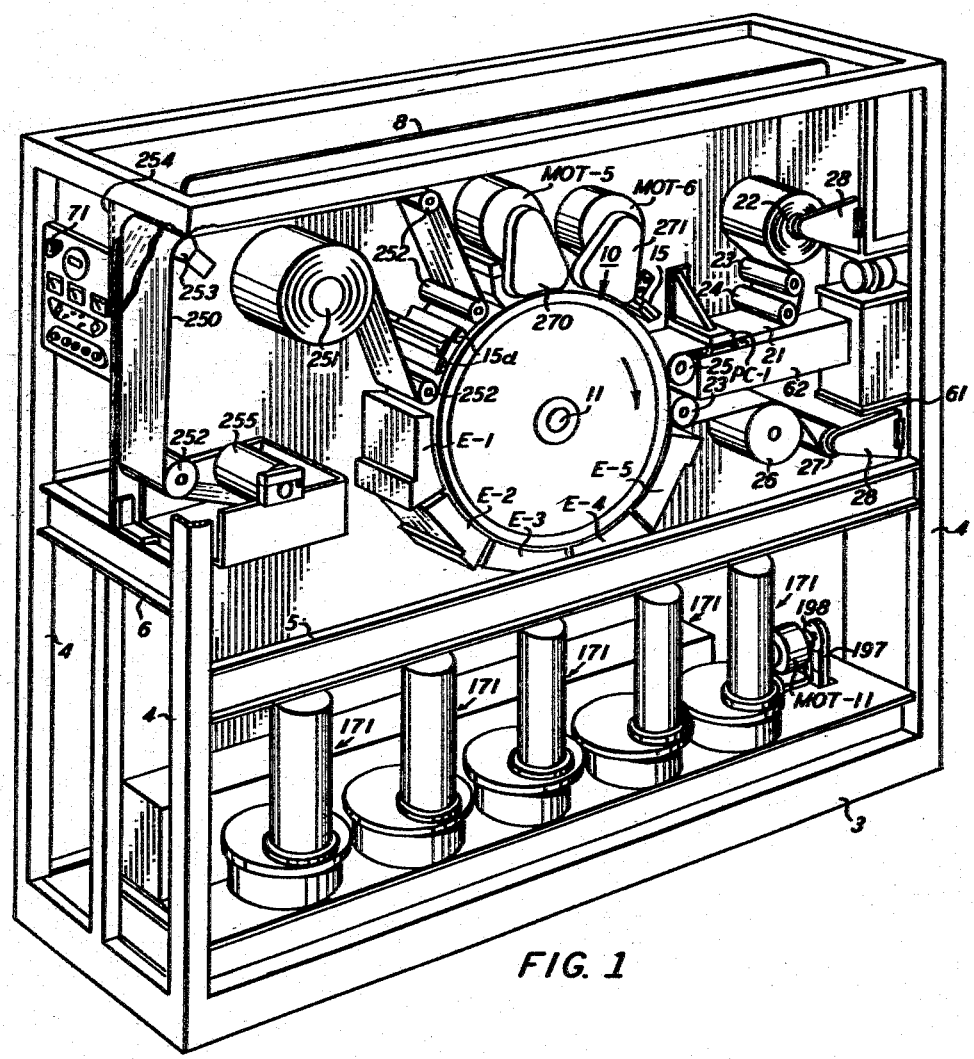
FIG. 1 illustrates schematically a preferred embodiment of a xerographic reproducing apparatus of the invention.

Referring now to FIG. 1 there is shown schematically a preferred embodiment of a xerographic reproducing apparatus adapted for continuous and automatic operation. The xerographic reproducing apparatus shown is a continuous contact printer and processor of one-to-one size prints from photographic serial negatives by contact printing of the film.

As shown, the xerographic apparatus comprises a xerographic plate including a photoconductive layer or light-receiving surface on a conductive backing and formed in the shape of a drum, which is journaled to rotate in the direction indicated by the arrow to cause the drum surface sequentially to pass a plurality of xerographic processing stations.

For the purpose of the present disclosure, the several xerographic processing stations in the path of movement of the drum surface may be described functionally, as follows:

A charging station, at which a uniform electrostatic charge is deposited on the photoconductive layer of the xerographic drum;

An exposure station, at which a light or radiation pattern of copy to be reproduced is projected onto the drum surface to dissipate the drum charge in the exposed areas thereof and thereby form a latent electrostatic image of the copy to be reproduced;

A developing station, at which a developing material is directed over the drum surface, whereby the developing material adheres to the electrostatic latent image to form a xerographic powder image in the configuration of the copy being reproduced;

A transfer station, at which the xerographic powder image is transferred from the drum surface to a transfer or support material; and, A drum cleaning and discharge station, at which the drum surface is brushed to remove residual particles of developing material remaining thereon after image transfer, and at which the drum surface is exposed to a relatively bright light source to effect substantially complete discharge of any residual electrostatic charge remaining thereon.

Figure 2:
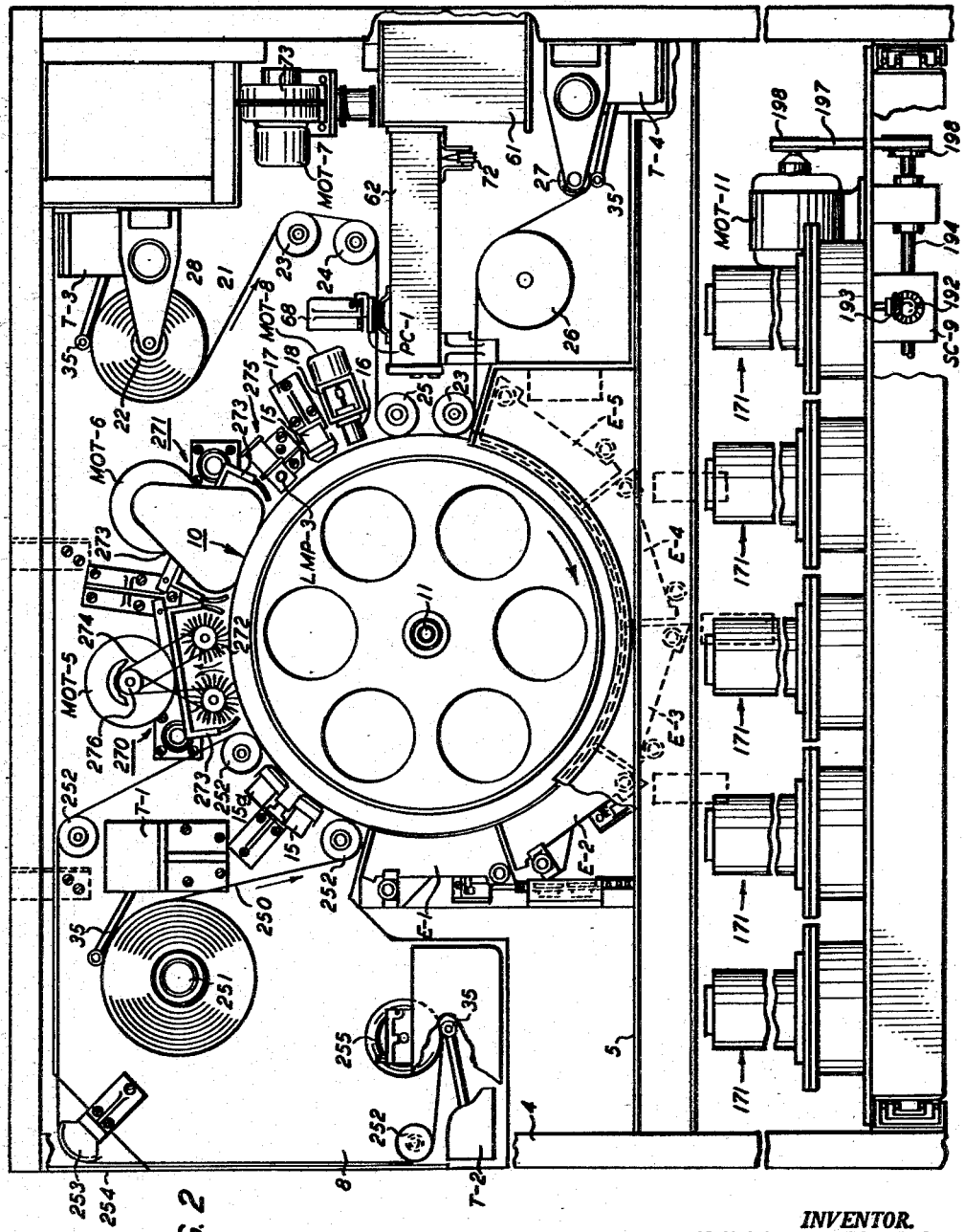
FIG. 2 is a front view of the xerographic reproducing apparatus with its enclosure covers removed.

Referring now to FIGS. 1 and 2, there is shown the general arrangement of the xerographic apparatus. As shown, there is provided a frame for supporting the components of the apparatus formed by a base plate 3 and uprights 4 connected together and maintained rigidly in spaced relation to each other by suitable tie plates, such as 5 and 6. A mounting plate 8 is supported by the tie plates intermediate the outer sides of the frame.

The xerographic drum 10 is mounted on horizontal driven drum shaft 11, the drum being positioned on the front of plate 8 as seen in FIG. 1. To drive the drum there is provided, as shown in FIG. 7, a drum drive motor MOT–9 secured by motor bracket 12 to plate 8. The shaft of motor MOT–9 is coupled to the input shaft of gear reducer 13 while the output shaft of the gear reducer is coupled to the end of drum shaft 11 which is journaled in bearing sleeve 14 connected at opposite ends to plate 8 and the gear reducer 13, the latter being mounted on horizontal frame element 7 of the frame.

At the charging station there is positioned a corona generating device 15 which includes a corona discharge array of one or more corona discharge electrodes that extend transversely across the drum surface and are energized from a high potential source, the electrodes being substantially enclosed within a shielding member. The potential applied to the drum depends upon the particular contrast desired in the finished reproductions; i.e., high contrast reproductions require higher initial drum potentials, whereas low contrast require lower initial drum potentials. Although any one of a number of types of corona generating devices may be used, a scorotron and its electrical control circuit, described in detail hereinafter, of the type disclosed in copending Codichini application, Serial No. 19,846, filed on April 4, 1960, now Patent 3,062,956, is used for charging the xerographic plate.

Positioned next adjacent to the corona generating device is a conventional rotating vane type electrometer 16 driven by a motor MOT-8 used to measure the potential applied to the plate by the corona generating device. The corona generating device 15 and the electrometer 16 are secured to brackets 17 and 18, respectively connected to plate 8 and are connected to an electrical circuit as shown in FIGS. 11, 11a, and 11b.

Exposure Mechanism

Next subsequent thereto in the path of motion of the xerographic drum is the exposure station. As shown, a contact exposure mechanism, constructed in accordance with the invention, is used to expose the image from a photographic serial negative onto the drum.

Figure 4:
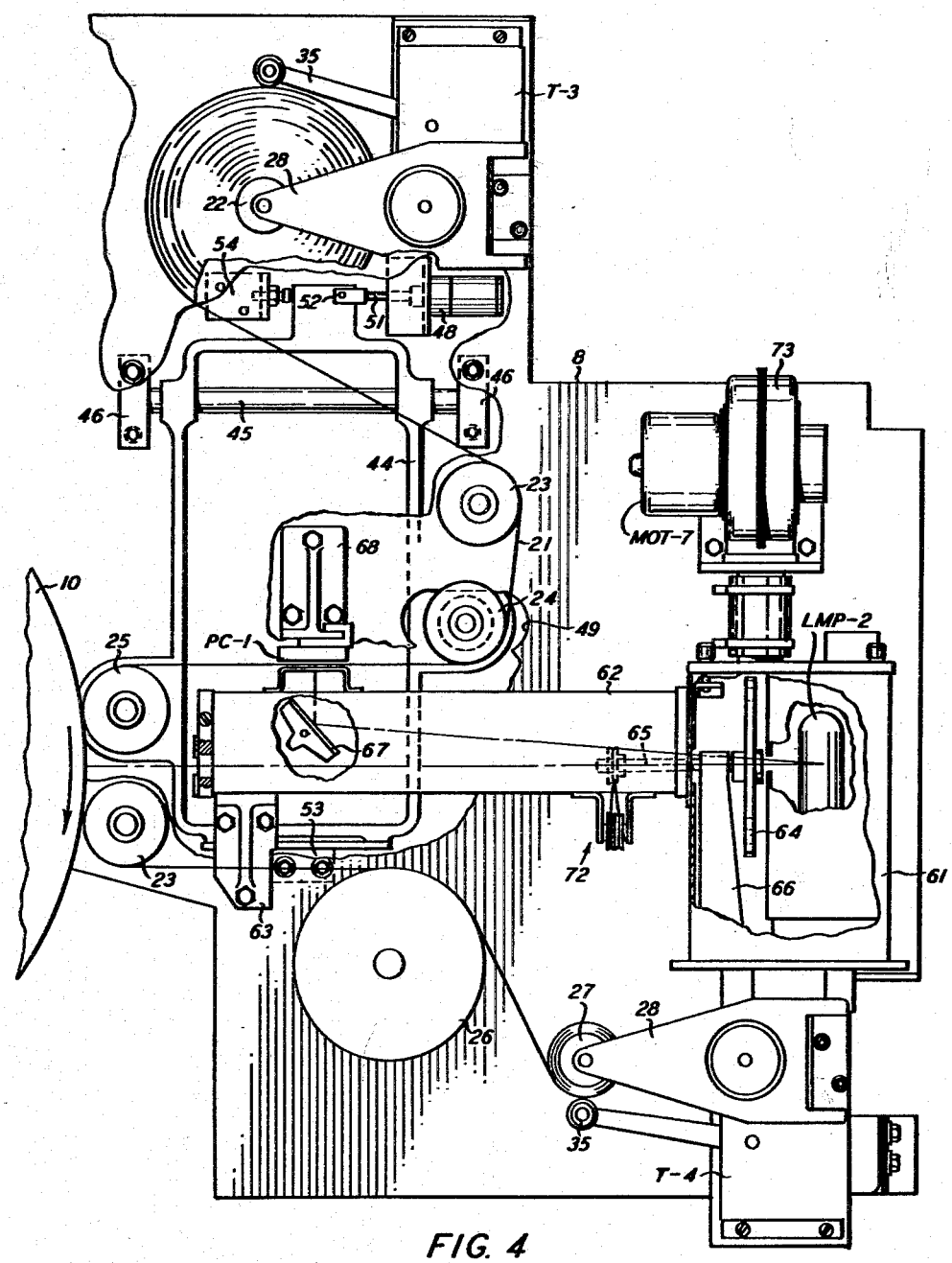
FIG. 4 is a front view of the film handling and projection apparatus of the machine.
Figure 5:
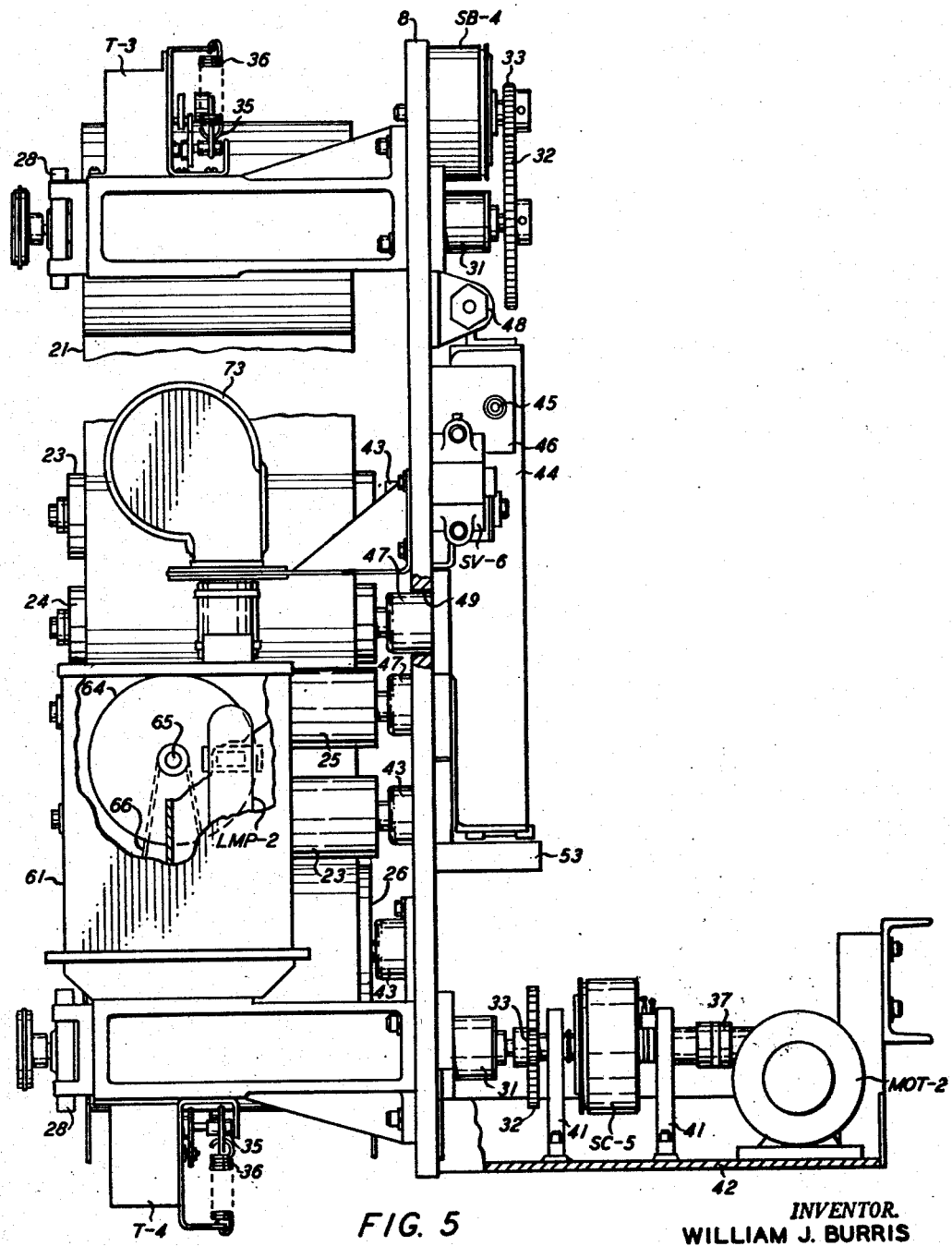
FIG. 5 is a right-hand side view of the film handling and projection apparatus.

As shown in particular in FIGS. 4 and 5, the film 21 is threaded from a supply roll 22 over idler rolls 23 and 24 then between the drum 10 and a rubber pressure roll 25, a second idler roll 23 positioned adjacent the drum, over an idler 26 and finally onto the rewind spool 27.

The supply roll 22, removably journaled at one end in a conventional hinged film gate assembly 28 connected to the front of mounting plate 8 and in bearing support 31 connected to the back side of the mounting plate, has a gear 32 connected thereto that meshes with gear 33 on the hysteresis brake SB-4, of conventional design, secured to plate 8 whereby a braking force is applied to the supply roll to prevent it from rotating freely. The power to the brake SB-4 is controlled by auto transformer T-3 directly geared to a follower or dancer roll 35 which rides on the film on the supply roll, the follower being forced into contact with the film by spring 36 connected at one end to the Variac and at its other end to the follower.

As the supply of film on the supply roll decreases, voltage applied to the brake SB-4 decreases, as does also the resistive torque of the brake. Thus, a constant force on the film is required to unwind the roll of film.

Like the supply roll, the rewind spool 27 is also journaled in a film gate assembly 28 and a bearing bracket 31. To drive the rewind spool, there is provided a gear head motor MOT-2 connected by coupling 37 to the input shaft of hysteresis clutch SC-5. The output shaft of this clutch has a gear 33 which drives the gear 32 connected to the rewind spool. Both the bearing mounts 41 in which the shafts of the clutch are journaled and the motor MOT-2 are secured to a suitable sub-base plate 42 connected to the frame of the machine.

The torque applied to the rewind spool is a function of the power applied to the hysteresis clutch SC-5. The power to the clutch SC-5 is controlled by a Variac T-4 which is regulated by a spring 36 biased follower or dancer roll 35 sensing the roll diameter of the film on the rewind spool. With this arrangement, the film web is subjected to the constant force required to unwind the film from the supply spool and to the constant force being supplied by the rewind spool. These forces are balanced so that when the drum is not in motion, the film is stationary. The film sandwiched between the drum and the pressure roll 25 is in friction contact with the drum to be advanced by the drum, synchronous motion of the film and drum thus being assured. The unbalancing force supplied by the drum drive can be relatively small in magnitude and yet the rewind spool is tightly wound with film and the film is maintained in constant tension to ensure good contact with the drum.

Idler rolls 23 and idler 26 are each journaled in suitable bearings 43 connected directly to mounting plate 8. However, to permit the pressure roll 25 to be brought into contact with the surface of the drum with the film sandwiched therebetween, or out of contact with the drum to permit threading of film therebetween, there is provided a roller carriage 44 movably supported on carriage rail 45 connected at opposite ends to rail brackets 46 secured to the back side or right hand side of mounting plate 8, as seen in FIG. 5.

The pressure roll 25 and idler roll 24 extend through suitably elongated slots 49 in the mounting plate 8 and are journaled at one end in bearings 47 secured to the roller carriage for movement therewith.

For moving roller carriage 44 and therefore idler roll 24 and pressure roll 25 from a first position in which the pressure roll is out of contact with the drum to a second position in which the pressure roll is in contact with the drum with film 21 sandwiched therebetween, there is mounted on the back side of mounting plate 8 an air cylinder 48 having its plunger 51 connected by pin 52 to the top of the roller carriage. As shown, the roller carriage is supported and guided near its top by carriage rail 45, while its lower portion rides on carriage guide 53 suitably secured to mounting plate 8.

Movement of the roller carriage to the left, as seen in FIG. 4, is limited by adjustable carriage stop 54 secured to the mounting plate 8.

Figure 10:
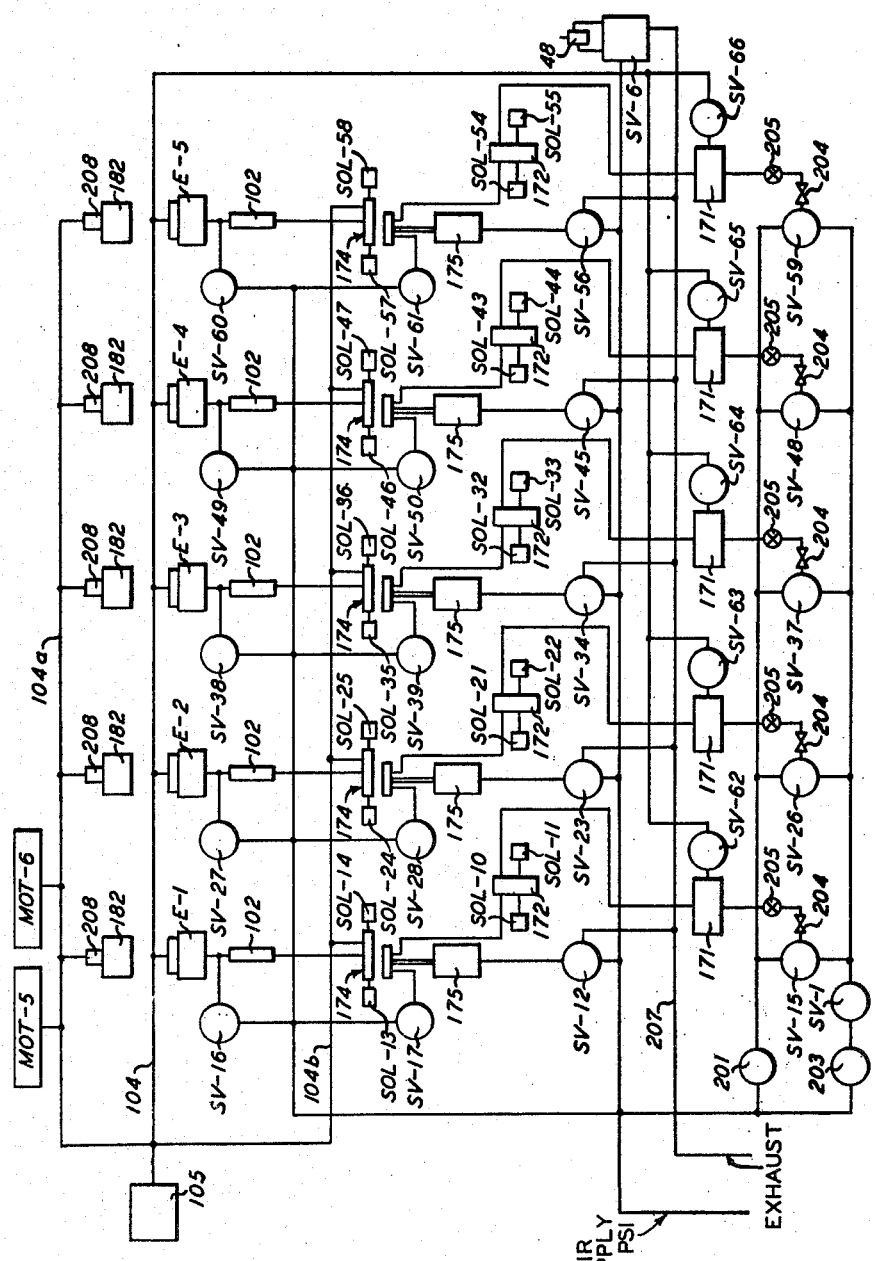
FIG. 10 is a schematic pneumatic circuit diagram of the xerographic reproducing apparatus.

The operation of the air cylinder 48 connected to a pneumatic circuit, as shown in FIG. 10, is controlled by solenoid valve SV-6 connected to mounting plate 8, as seen in FIG. 5.

Exposure of the drum to the image carried by the film is made by a projection lamp LMP-2 positioned within a suitable lamp housing 61, the light being projected through suitable slots in the walls of the lamp housing then through the slotted projection tube 62 which is connected at one end to the lamp housing and at its opposite end to bracket 63 secured to plate 8. The intensity of the light striking the drum surface through the film is modulated by the circular Inconel coated density wedge 64 mounted on shaft 65 journaled in bracket 66 mounted within the lamp housing. A beam splitting mechanism 67 is arranged within the projection tube so that a certain portion of the light that passes through the circular density wedge is reflected up through a suitable slot in the upper wall of the projection tube 62 and directed through the film 21 passing thereover and then onto a photovoltaic cell PC-1 mounted on bracket 68 adjacent to the projection tube and over the film. The photovoltaic cell is used to measure the average density of the negative and to record the film density on meter M-6 as shown schematically in FIG. 11a.

The operator can vary the amount of light to be projected through the film to compensate for variations in the density of the film by turning an exposure control knob 71 positioned on the control panel at the front exterior of the machine. The control knob 71 is connected through a suitable pulley mechanism 72 (part of which is shown) to the shaft 65 for rotating the density wedge 64 to regulate the amount of light striking the drum surface through the film. A conventional motor MOT-7 driven blower 73 is connected to the lamp housing to dissipate heat generated by the projection lamp.

Development System

The electrostatic latent image produced by exposure of the charged drum to an image pattern of light is developed with charged powder which, under the influence of electrostatic forces, deposits on the drum taking the form of the electrostatic latent image thereon. In the development system of the apparatus, the xerographic plate passes over development electrodes, each having a slot therein from which an aerosol of charged development powder is directed into a development zone defined as the space between xerographic drum and the development electrodes. The aerosol of developer powder, or powder cloud as it is generally referred to, is produced in a disc generator in which an air stream raises a cloud of developer powder from a powder-covered revolving disc. A fine tube located in the development electrode charges the powder triboelectrically by the impact of particles against the wall as the air stream carrying the powder moves through it in turbulent flow.

In the apparatus disclosed, development of the electrostatic latent image on the xerographic plate is accomplished by five identical development electrodes E–1, E–2, E–3, E–4 and E–5 of the type disclosed in copending Hayford et al. application Serial No. 725,558, filed April 1, 1958, now Patent 2,965,069, the development electrodes being formed to match the contour of the drum.

Since the five development electrodes and the elements associated therewith are identical to each other except for their mounting positions, resulting in minor structural modifications to permit their mounting in these positions, it is deemed necessary to describe in detail only one development electrode and its associated elements.

As shown, each development electrode is formed of electrically conductive material to conform to the contour of the drum. As seen in FIG. 6, each development electrode contains an entrance slot 101 directed to oppose the rotation of the drum through which the charged developing material is directed into the developing zone. The entrance slot extends transversely of the development electrode but terminates inside the margin of the electrode so that the developing material is retained within the development zone, each development electrode being wide enough, so that the entrance slots extend substantially the full width of the drum.

Mounted within each development electrode is a ceramic needle 102, shown schematically in FIGS. 9, 9a, and 10, of the type disclosed in Hayford Patent 2,859,129 issued November 4, 1958, for charging the developer material triboelectrically as it passes therethrough. Each entrance slot is connected by a suitable powder cloud line to a source of powdered developer material or to a clean air line controlled by a suitable electrode purge valve mounted on the electrode, as described hereinafter.

Each development electrode contains a pair of vacuum slots 103 positioned on opposite sides of the entrance slot and parallel thereto for the removal of excess developer material from the development zone. The vacuum slots are suitably connected by a common vacuum line or conduit 104 as shown schematically in FIG. 10 to a conventional dust collector 105 which may, for example, comprise a blower connected to a dust filter, preferably mounted externally of the machine.

For supporting the development electrode elements in the machine there is provided a front rail mounting plate 111 and a rear rail mounting plate 112 suitably attached to the main frame elements of the machine previously described.

Each development electrode is supported for transverse movement by pairs of transverse rails 113. Each transverse rail is secured at opposite ends in an insulated rail brushing 114 mounted in a bushing housing 115 secured to a rail mounting plate. For insulating the electrodes from the frame of the machine there are provided insulator washers 116 held in place by adjusting screws 118 threaded through insulator screw bushings 117 positioned in suitable apertures in the rail mounting plates.

For moving each development electrode from a first position or forward position, in which the electrode is in operative relation with respect to the drum, to the left as seen in FIG. 7, to a second position in which it is moved away from the drum or to the rear of the machine for the purpose of cleaning the electrode, each development electrode is connected by a chain bracket 122 to a chain 123 which is driven either clockwise or counter-clockwise by an electrode clutch drive mechanism described hereinafter. Bumpers 121 secured to the inner faces of the bushing housing 115 limit the movement of the electrodes in either direction.

The electrode clutch drive mechanism, for moving the development electrodes, includes a pair of commercially available magnetic clutches of conventional design for each development electrode; a clutch for driving the electrode forward into its first portion or operative position and a clutch for driving the electrode back to its second position or purge position.

Referring specifically to FIGS. 6, 7 and 8, a pair of parallel shafts 133, journaled in sleeve bearings 134 positioned in the angle brackets 135 secured to mounting plate 128 suitably supported on the frame of the machine, are used to supply the input power of these clutches. Each shaft 133 has fastened at an end thereof a gear 136 driven by motor MOT–3 through drive gear assembly 137 supported by the left-hand end angle bracket 135, as seen in FIG. 6, the shaft of motor MOT–3 being connected to the shaft of the drive gear assembly by coupling 138.

Although the clutches used to drive the development electrodes are a common commercial type magnetic clutch, a brief description of these clutches is deemed appropriate. As shown in FIG. 8, each clutch includes a stationary field 141 secured to an angle bracket 135. The rotor assembly 142 of each clutch is secured to a shaft 133 by a key 143 for rotation therewith while the armature assembly 144 is positioned by a retainer ring 147 on splined armature hub 145 rotatably supported with respect to the shaft 133 by means of sleeve bearings 146. The forward drive clutches are designated SC–7, SC–18, SC–29, SC–40 and SC–51 and the back drive clutches are designated SC–8, SC–19, SC–30, SC–41 and SC–52 for moving electrodes E–1, E–2, E–3, E–4 and E–5, respectively.

A gear 151 and a sprocket hub 152, fastened together by screws 153, are mounted on the splined armature subs 145 of each of the clutches SC–7, SC–18, SC–29, SC–40 and SC–51 and a gear 154 and a plain hub 155 are mounted on the splined armature hubs 145 of each of the clutches SC–8, SC–19, SC–30, SC–41 and SC–52. These assemblies are held in place axially at one end by set collars 156 and 156a, the other end of each assembly riding against a thrust washer 157.

Each sprocket hub 152 has a chain 123 attached thereto, each chain passing from a sprocket hub 152 up over a sprocket 161 around a sprocket 162 then parallel to the transverse rails 113 to and around a sprocket 163 down over sprocket 164 back to the sprocket hub. A development electrode is connected to a chain intermediate sprockets 162 and 163 by a bracket 122.

Each set of sprockets 161, 162, 163 and 164 are journaled in an open-ended chain guard 165 suitably connected to a frame element of the machine as determined by the location of the development electrode which it serves.

As the shafts 133 are rotated counterclockwise by motor MOT–3, the rotors of the clutches will rotate with the shafts while the armature assemblies of the clutches will remain stationary due to friction of the elements attached thereto. As the field of a rear drive clutch is energized, magnetic flux flows through the rotor, attracting the armature assembly, the latter being driven by friction between these two elements to rotate the gear 154 counterclockwise; gear 151 and the sprocket hub 152 of the associated forward drive clutch is caused to move clockwise to move the associated development electrode to the right as seen in FIG. 7. As the field of a rear drive clutch is de-energized and the field of a forward drive clutch is energized, its armature assembly and the gear 151 and associated sprocket hub 152 thereon is driven counterclockwise to drive the development electrode to the left or first position. At the same time, the gear 151, of this forward drive clutch, which is rotating counterclockwise, drives the gear 154 of the associated forward drive clutch clockwise, the latter being free to rotate since it is not energized.

As described hereinafter, the operation of these clutches to effect sequential movement of the development electrodes is controlled by a conventional motor driven electromechanical timer 3TR.

*Powder Cloud Delivery and Purging System.*

The powder cloud delivery and purging system of the apparatus is illustrated schematically in the pneumatic circuit diagram of FIG. 10, and a slightly more detailed schematic illustration of the pneumatic circuit for the elements associated with a single development electrode, using the elements associated with development electrode E-1 as an example, is shown in FIGS. 9 and 9a.

Although any suitable powder cloud generator may be used, the powder cloud generators 171, used for each of the five development electrodes, are of the type disclosed in copending Huber application Serial No. 19,845, now Patent No. 3,094,248, filed April 4, 1960. A powder cloud generator of this type is shown schematically only in FIGS. 9, 9a and 10, since the details of the specific construction of a powder cloud generator is not deemed pertinent to the subject invention. For purposes of the present disclosure, it is deemed sufficient to note that each of the powder cloud generators consists of a reservoir 183 wherein development material is metered by at least one metering blade 184 onto a rotating cloth-covered disc 185 journaled for rotation within the reservoir. As the cloth-covered disc passes beneath a metering blade 184, a thin film of powder developing material is spread over the surface of the cloth-covered disc.

The entire powder cloud generator unit is pressurized so that as the disc 185 passes beneath a pick-up tube or pick-up head 186, the thin layer of metered powder on the disc is picked up by out-rushing air as it passes through the pick-up tube. Additional toner is continuously deposited on the disc 185 in front of the blade 184 from a suitable toner dispenser 188. The disc 185 is mounted on a suitable shaft journaled in the wall of the reservoir and is driven by a drive means described hereinafter.

During the powder cloud generating cycle pressurized aeriform fluid at a pressure of approximately 20 pounds per square inch gauge is delivered to the powder cloud generator from a suitable source, such as an air compressor. The output from the powder cloud generator is controlled by a commercial type non-clogging valve, such as pinch valve 172, controlled by suitable actuators, such as, for example, solenoids SOL-10 and SOL-11 for the pinch valve controlling powder flow to development electrode E-1.

From the powder cloud generator the powder cloud is delivered through a pipe coupler 174 of the type disclosed in copending Burris et al. application, Serial No. 742,372, filed June 16, 1958, now Patent 2,965,136. The pipe coupling is used to permit the powder line from the powder cloud generator to be coupled through the ceramic needle 102 in the development electrode or to permit the powder line from the powder cloud generator to be connected to the exhaust conduit of the system, and to permit a high pressure air line to be connected to the development electrode through the ceramic needle. As shown in FIGS. 9 and 9a, the first element or the female coupling 174A of the pipe coupler can be shifted to either the right or left to align the conduit from the ceramic needle in the development electrode either with the powder line from the powder cloud generator or to a clean high pressure air conduit by means of a suitable actuator, such as the solenoids SOL-13 and SOL-14 for development electrode E-1. The second element or male coupling 174B of the pipe coupler is driven into or out of engagement with the female coupling 174A by means of an air cylinder 175, the piston of which is connected in a suitable manner to the male coupling 174B. Admission of pressurized aeriform fluid to actuate the air cylinder 175 is controlled by a suitable coupler slide valve, such as by means of a solenoid-actuated valve SV-12 of conventional construction, in the pneumatic circuit for development electrode E-1.

As shown in FIG. 9, which illustrates the position of the various elements associated with development electrode E-1 during the development cycle, the female coupler 174A, when shifted to the right, as seen in this figure, by actuation of solenoid SOL-14, connects the conduit from the powder cloud generator 171 to the development electrode E-1 via the ceramic needle 102. The pinch valve 172 in this circuit is maintained in an open position by actuation of solenoid SOL-10 during the development cycle to permit the flow of the powder cloud therethrough. The powder cloud in passing through the ceramic needle 102, previously described, effects triboelectric charging of the powder.

To clean the development electrodes, the ceramic needles, and the powder-carrying conduits connecting these elements with the powder cloud generator, it is necessary to sequentially shift the development electrodes to the rear of the machine so that clean air may be pulsed through these elements to purge them of developer powder. At the start of the purge cycle, the drive to the disc 185 of the powder cloud generator for the development electrode being withdrawn from its operating position is disengaged. The air cylinder 175 is actuated to uncouple the male coupling 174B from the female coupling 174A to permit the latter to be shifted to the left as solenoid SOL-13 is energized, whereby the powder line from the powder cloud generator is in alignment with the exhaust conduit 104B and whereby a clean air conduit is positioned in alignment with the conduit connected through the ceramic needle in the development electrode. Then the air cylinder 175 is again actuated through the solenoid controlled valve SV-12 to couple the male coupling 174B to the female coupling 174A.

Solenoid valve SV-15 is then energized to connect the powder cloud generator to the 50-pound per square inch air line whereby high pressure air is delivered to the powder cloud generator. At the same time solenoids SOL-10 and SOL-11 are sequentially energized to effect the cyclic opening and closing of the pinch valve 172 to effect a pulsating flow of air through the powder cloud generator and through the powder line, whereby the pick-up tube of the powder cloud generator and the powder line are cleaned. Powder cleaned from the pick-up tube 186 and from the powder line is delivered through exhaust conduit 104B to a conventional dust collector 105 positioned externally of the machine. At the same time the line connected via the ceramic needle 102 in the development electrode is connected to the 100-pound per square inch line through the pipe coupler 174 and the solenoid-actuated ceramic needle purge valve SV-17 in the 100-pound pressure line is sequentially energized and then de-energized whereby this valve is rapidly opened and closed, causing the high pressure clean air to be pulsed through the ceramic needle and the development electrode. Simultaneously, the development electrode is connected directly to a branch of the 100-pound per square inch line through an electrode purge valve, herein shown as a solenoid-actuated valve SV-16 for development electrode E-1, which is cyclicly energized to cause a pulsating flow of air through the development electrode.

The development electrode during the purging operation is positioned at the rear of the machine and under a dust hood 182, described in detail hereinafter, connected to the dust collector 105 by a conduit 104A.

As previously described, the purging of a development electrode and its associated elements with clean high pressure air occurs when the development electrode is in the purge position, that is, away from the xerographic drum, the remaining development electrodes of the system being in their first position or forward position whereby the electrostatic latent image on the drum is at all times being developed by the equivalent of four development electrodes, as shown in the timing chart of FIGS. 12 and 12a.

Figure 3:
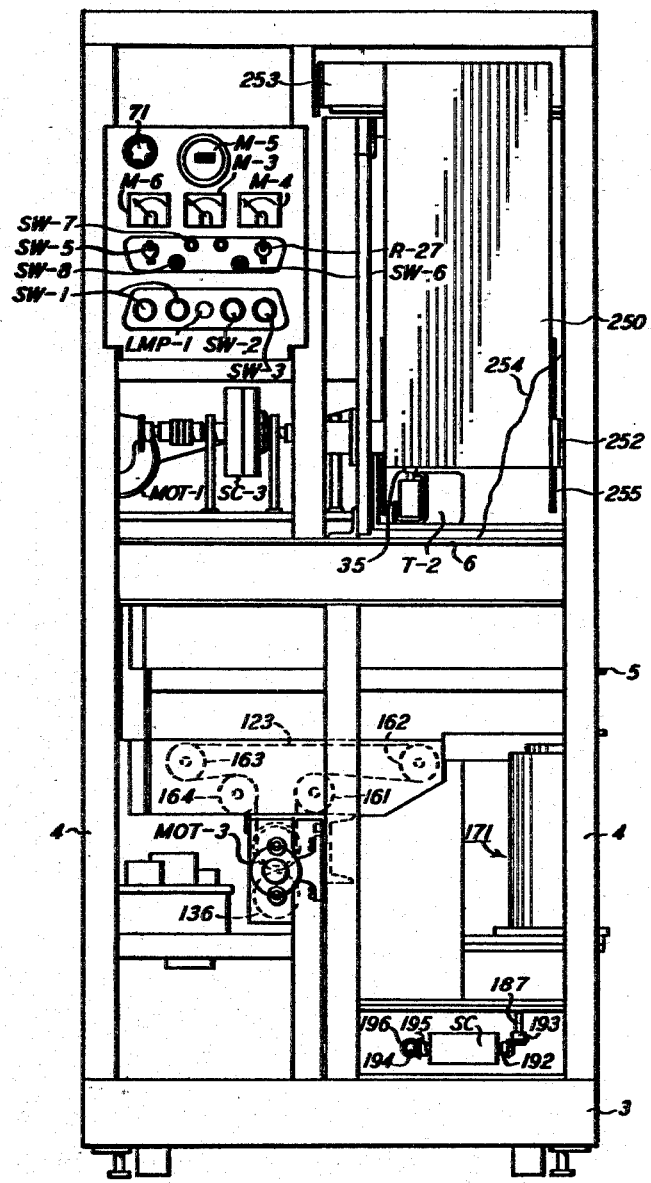
FIG. 3 is a left-hand side view of the xerographic reproducing apparatus.

The powder cloud generators for each of the development electrodes are driven independently of each other by means of suitable electric clutches. As shown in FIGS. 2 and 3, the output shaft of each clutch has a gear 192 mounted thereon which meshes with a driven gear 193 on the shaft 187 of a powder cloud generator. The input shaft of each clutch is connected to a motor MOT–11 driven shaft 194 by gears 195 and 196 mounted on the input shafts of the clutches and on the shaft 194, respectively. The shaft 194 is suitably journaled and operatively connected to motor MOT–11 by belt 197 encircling pulleys 198 mounted on the end of shaft 194 and the shaft of the motor MOT–11. Each of the clutches driving the powder cloud generators 171 is a conventional magnetic clutch designated as clutches SC–9, SC–20, SC–31, SC–42 and SC–53 in the electrical circuit for driving the powder cloud generators 171 delivering a powder cloud to development electrodes E–1, E–2, E–3, E–4 and E–5, respectively.

Since it is not deemed necessary to show the actual details or location of the common hardware used in the pneumatic circuit of the apparatus, these elements are only shown schematically in FIGS. 9, 9a and 10. As shown, the 50, 20 and 100-pound per square inch air lines, previously described, are preferably connected y a common intake line to a suitable source of pressurized aeriform fluid, such as a commercial compressor located externally of the machine. The pressure to the 50-pound pressure line is controlled by a pressure regulator valve 201 and the pressure to the 20-pound line is controlled by a pressure regulating valve 203. A solenoid-controlled main air valve SV–1 is positioned in the 20-pound line to control the flow of air to the normally closed solenoid-operated generator pressure valves SV–15, SV–26, SV–37, SV–48 and SV–59.

The generator pressure valves SV–26, SV–34, SV–48 and SV–59 controlling the air flow to the powder cloud generators that service the development electrodes E–2, E–3, E–4 and E–5, respectively, are solenoid-operated valves like the generator pressure valve SV–15, previously described.

A suitable check valve 204 and a manually operated shut-off valve 205 are interposed between each of the generator pressure valves and their respective powder cloud generators. The shut-off valves 205 are installed in the conduit to the powder cloud generators to permit the operator to shut off the flow of pressurized aeriform fluid to these units as desired.

To bleed aeriform fluid from the powder cloud generators, solenoid-operated blow down valves SV–62, SV–63, SV–64, SV–65 and SV–66 are mounted in the line connecting the powder cloud generators to a common exhaust conduit 104.

Flow of aeriform fluid to the remaining air cylinders 175 associated with development electrodes E–2, E–3, E–4 and E–5 is controlled by coupler slide valves SV–23, SV–34, SV–45 and SV–56, respectively. The ceramic needle purge valves SV–28, SV–39, SV–50 and SV–61 are used to control the flow of clean pressurized aeriform fluid through the ceramic needles in development electrodes E–2, E–3, E–4 and E–5, respectively. Electrode purge valves SV–27, SV–38, SV–49 and SV–60 are used to control the flow of clean pressurized aeriform fluid to development electrodes E–2, E–3, E–4 and E–5, respectively.

The coupler slide valves SV–12, SV–23, SV–34, SV–45 and SV–55, and the valve SV–6 controlling the flow of air to air cylinders 175 and 48, respectively, are conventional three-way valves to permit pressurized aeriform fluid to flow to the air cylinders from the 100-pound pressure line and to exhaust the expanded aeriform fluid from the air cylinders via a common exhaust conduit 207.

The actuation of the pinch valves 172 and the shifting of the female coupling 174A of pipe coupler 174 are effected by means of a pair of solenoids associated with each of these elements. The operation of the pinch valves 172 is effected by the following pairs of solenoids: SOL–10, SOL–11; SOL–21, SOL–22; SOL–32, SOL–33; SOL–43, SOL–44; and SOL–54, SOL–55. The shifting of the female couplings 174A is effected by the following pairs of solenoids: SOL–13, SOL–14; SOL–24, SOL–25; SOL–35, SOL–36; SOL–46, SOL–47; and SOL–57, SOL–58. Each of the above-described sets of solenoids are given in the order of their relationship to the development electrodes E–1, E–2, E–3, E–4, and E–5, respectively.

To remove developer powder particles from the dust hoods 182 each hood is connected to the inlet of a blower 208, the outlet of each blower being connected to a common vacuum conduit 104a. In the apparatus shown, each blower is driven by a separate motor, the motors being designated as MOT–12, MOT–13, MOT–14, MOT–15, and MOT–16 in the electrical circuit for the dust hoods for development electrodes E–1, E–2, E–3, E–4, and E–5, respectively.

*Transfer Mechanism*

In the transfer station, the powder image developed on the xerographic drum is transferred to a web of support material, in this case a plastic-coated paper, by means of electrostatic image transfer. In this process, the web of support material is brought into contact with the drum, and an electric field applied to the back of the support material causes the powder particles to adhere to the support material. The charge deposited on the paper is generated by a pair of high voltage corona generating devices 15a similar to the corona generating device previously described.

As shown, a web of support material 250 moves from a supply roll 251 around an idler roll 252, contacting the drum under the pair of high voltage corona generating devices 15, then around a second idler roll 252, up over a third idler roll 252, across to and around heat fuser 253, down behind a viewing platen such as glass plate 254, under an idler roll 252, to be wound up on the take-up spool 255.

The fuser 253 consists of a suitable resistor R–1 heated platen which is maintained by a suitable thermoswitch THS–1 described hereinafter, at a constant fusing temperature to fuse the powder images onto the web of support material to form a permanent image.

A tension and tension control mechanism similar to that previously described for the film handling system is used to ensure adequate tension on the support web to permit the web to be advanced by frictional contact with the drum to insure synchronous movement of the web and drum. Since the mounting of the supply roll 251, idler rolls 252 and take-up spool 255, and the braking mechanism and drive mechanism for the supply roll 251 and take-up spool 255, respectively, are substantially similar to the equivalent elements of the film handling system and since the specific details of these elements form no part of the subject invention they are not described or illustrated in detail herein.

However, to permit a clearer understanding of the operation of the apparatus, the electrical control elements of the support web handling mechanism are shown in FIG. 11.

The web supply roll is connected to a hysteresis brake

SB-2 (not shown) similar to brake SB-4 and the power to the brake SB-2 is controlled by a Variac T-1 in the same manner as power to brake SB-4 is controlled by Variac T-3 in the film handling system.

The web take-up spool 255 is driven by a motor MOT-1 through a hysteresis clutch SC-3 similar to clutch SC-5, and the power to clutch SC-3 is controlled by Variac T-2, in the same manner as power to clutch SC-5 is controlled by Variac T-4 in the film handling system.

*Drum Cleaning and Discharge*

To remove residual particles of developer material remaining on the drum after image transfer, there is provided a pair of drum cleaning mechanisms 270 and 271, each comprising a pair of rotatable brushes 272 of such construction as to apply extremely light pressure to the photoconductive surface of the xerographic plate to dislodge any particles of developer material that may adhere thereto. Each pair of brushes, journaled in a dust collector chamber 273 connected to mounting plate 8, are rotated by means of belts 273 encircling pulleys 276 connected to the brushes and motors, in the directions shown in FIG. 2 to fan air upward from the drum between the brushes. The rotation of the brushes causes a pumping action, forcing air and particles of developer material removed from the drum into the dust collector chamber from where it is exhausted through vacuum conduit 104 to the dust collector 105.

The brushes of drum cleaning mechanisms 270 and 271 are driven by motors MOT-5 and MOT-6, respectively.

Positioned next to the second drum cleaning unit 271 is a discharge lamp assembly 275 having a light source LMP-3 therein to flood the surface of the drum with light to dissipate any residual electrostatic charge remaining on the drum.

*Machine Operation*

A clearer understanding of the operation of the xerographic reproducing machine of the subject invention can best be obtained by reference to the schematic wiring diagram of the machine, the sequence of operation chart and the following description.

Before starting the machine, a web of film or other copy containing images to be reproduced, and a supply of support material onto which the reproduced images are to be transferred are placed on the respective supply rolls and threaded around the film handling mechanisms and the support material handling mechanisms, respectively, as previously described. The powder cloud generators are charged with a supply of developer material before pressurized aeriform fluid is delivered to the generators.

The air compressor or other source of pressurized aeriform fluid connected to the pneumatic system of the machine, and the dust collector are preferably not an integral part of the machine but separate elements operated independently of the control circuit of the xerographic apparatus. Their operation is not described in detail herein except to note that they must be in operation before the xerographic process is initiated.

The first operation on starting the xerographic machine is for the operator to press the start button or "Power-On" switch SW-1. Switch SW-1 is a single throw, two pole switch which connects the apparatus to a source of electrical power, such as a commercial 235-volt 60-cycle outlet.

Upon closure of switch SW-1, electrical power flows through normally closed thermostat THS-1 to control relay 1CR to effect closure of its normally open contact 1CRA connected in series with the resistor R-1 of the fuser. Indicator lamp LMP-1 connected in parallel with resistor R-1 is energized when power is supplied to the fuser through contact 1CRA as a visual indication to the operator that the fuser is in operation. While switch SW-1 remains closed, the thermostat THS-1 will continue to control the energization of the resistor R-1 through the control relay 1CR.

Power is also applied to a conventional voltage stabilizer unit designated T-5 for high voltage power supply for transfer PS-1 and the high voltage power supply for charging PS-2, and to the regulated power supply and current stabilizer chassi described in detail hereinafter. Power is transmitted to the conventional voltage power supplies PS-1 and PS-2 at this time to permit the filaments of these units to heat. Normally closed contact 3TR-1 will also energize the motor MOT-3TR for a sequence-of-events timer 3TR.

The sequence-of-events timer 3TR and the purge cycling timer 4TR are well known conventional type electrical mechanical timers which include one or more cams positioned on a rotatable shaft to actuate switches to close their contacts, the angular displacement of the risers on the cams and the location of the switches being readily determined in accordance with the desired actuation time of these switches as determined by the sequence of operation chart.

The shaft of timer 3TR and the shaft of timer 4TR, not shown, are rotated at predetermined speeds by suitable constant speed motors such as motors MOT-3TR and motor MOT-4TR, respectively. Since the specific detailed configuration of the cams and the switches actuated thereby do not form a part of this invention, the timers 3TR and 4TR are not shown or described in detail, it being deemed sufficient only to illustrate the contacts of the switches schematically in the electrical circuit diagram, and the time sequence of operation of these switches in the sequence of operation chart.

Referring again to the operation of motor MOT-3TR, this motor will operate to reset timer contact 3TR-1, that is, it will operate until all of the contacts 3TR-2 to 3TR-31, inclusive, of the timer are closed at which time contact 3TR-1 is opened to de-energize this motor. Although contacts 3TR-2 to 3TR-31, inclusive, are closed during the reset cycle of the timer, they do not affect the operation of other elements in the circuit since the electrical conductive lines to these elements controlled by the timer are de-energized during this period.

Next the print-run switch SW-2 is momentarily closed by the operator to thereby energize control relay 2CR, closing its holding contact 2CR-1. At the same time, control relay 3CR is energized through normally closed contact 2TR-1 of the end-of-operation timer 2TR. As control relay 3CR is energized, its contacts 3CR-1, 3CR-2, 3CR-3, and 3CR-4 are closed. As contact 3CR-3 is closed, control relay 6CR is energized to close its contact 6CR-1 which together with closed contacts 3CR-1 and 2CR-1 form a holding circuit whereby the operator may release the print-run switch SW-2.

Power is also transmitted through the closed contact 3CR-3 through the variable resistor R-12 to the high voltage power supply PS-1 to apply a screen potential to the corona generating devices 15a. The corona generating devices 15a may be energized at this time even though the xerographic drum is not rotating because the sheet of support material interposed between the transfer scorotron and the drum will protect the photoconductive surface of the xerographic drum.

Solenoids SOL-14, SOL-25, SOL-36, SOL-47, and SOL-58 are energized to shift the male couplers 174A to the right as seen in the pneumatic circuit diagram in position to connect the powder lines from the powder cloud generators to their respective development electrodes. These solenoids are energized through the normally closed contact 3TR-6B, 3TR-12B, 3TR-18B, 3TR-24B, and 3TR-30B, respectively as power is supplied to this portion of the circuit through closed contact 3CR-4.

Also as contact 3CR-4 is closed, the solenoid-operated coupler slide valves SV-12, SV-23, SV-34, SV-45 and SV-56 are energized through closed contacts 3TR-5, 3TR-11, 3TR-17, 3TR-23, and 3TR-29, respectively, to effect operation of the air cylinders 175 to couple the male pipe couplings 174B to the female pipe couplings 174A as previously described.

The film wind-up motor MOT-2 is energized and the electrode drive motor MOT-3 is energized, the latter driving the shafts 133 of the electrode drive assembly.

A conventional full wave rectifier arrangement, composed of selenium rectifiers SR-17, SR-18, SR-19 and SR-20, inclusive, is used to provide direct current (D.C.) power to energize the clutch drives for the electrodes and powder cloud generators. The clutches used to drive the electrodes to their forward or operative position, that is, clutches SC-7, SC-18, SC-29, SC-40, and SC-51 are energized through contacts 3TR-2B 3TR-8B, 3TR-14B, 3TR-20B, and 3TR-26B. Normally closed switches 3LS, 7LS, 11LS, 15LS, and 19LS are secured to the front mounting plate 111 of the development electrode assembly whereby these switches will be actuated by electrodes E-1, E-2, E-3, E-4 and E-5, respectively, when these electrodes are in the forward position whereby the power to the clutches SC-7, SC-18, SC-29, SC-40 and SC-51 is delivered through resistors R-2, R-4, R-6, R-8 and R-10, respectively, to operate the forward drive clutches at reduced torque; but when the clutches are to be operated to drive the electrodes to their forward position, the limit switches 3LS, 7LS, 11LS, 15LS, and 18LS, are closed, to, in effect, bypass these resistors to apply full power to the forward drive clutches for operation at full torque.

A second group of normally closed limit switches 4LS, 8LS, 12LS, 16LS, and 20LS are mounted on the rear mounting plate 112 to be open by the development electrodes E-1, E-2, E-3, E-4 and E-5, respectively, so that when these development electrodes are in their respective purge position, power to the rear drive clutches SC-8, SC-19, SC-30, SC-41, and SC-52 is delivered through resistors R-3, R-5, R-7, R-9 and R-11, respectively, to operate these clutches at reduced torque.

The limit switches 4LS, 8LS, 12LS, 16LS and 20LS are mounted on the rear mounting plate 112 adjacent a set of normally open limit switches 5LS, 9LS, 13LS, 17LS and 21LS, respectively. As seen in FIG. 11b, the limit switches 5LS, 9LS, 13LS, 17LS and 21LS closed by the development electrodes E-1, E-2, E-3, E-4 and E-5, respectively, when in their purge position, are used to control the energization of the electrode purge valves SV-16, SV-27, SV-38, SV-49 and SV-60, respectively, and the ceramic needle purge valves SV-17, SV-28, SV-39, SV-50 and SV-61, respectively.

Normally open limit switches 2LS, 6LS, 10LS, 14LS and 18LS are also mounted on the front mounting plate 111 of the development electrode assembly so that these switches are closed by their respective development electrodes when in the forward or operating position whereby the clutches SC-9, SC-20, SC-31, SC-42 and SC-53 controlling the operation of the disc generators for development electrodes E-1, E-2, E-3, E-4, and E-5, respectively, are operated so that a cloud of powder developing material is generated to be delivered to the development electrode when in their operative position.

Also the print-run switch SW-2 is closed, a five-second delay timer 1TR is also energized through the normally closed contact 5CRB of control relay 5CR. Timer 1TR is a conventional thermo delay timer chosen to permit a five-second delay between the time its filaments are energized to the time the filaments are heated sufficiently to close contact 1TR-1. This time delay is required to permit the elements previously described as being energized upon closure of switch SW-2 to have sufficient time to operate to effect actuation of their associated elements to bring the machine in a stand-by condition in readiness for an actual operating or reproducing cycle.

Thus, approximately five seconds after print-run switch SW-2 is closed, the timer 1TR will heat sufficiently to close its contact 1TR-1 to energize control relays 7CR and 4CR. As control relay 7CR is energized, its contact 7CR-1 is closed to re-energize motor MOT-3TR which effects operation of the control timer 3TR. After a short period of operation, shown on the timing chart as approximately two seconds, the contact 3TR-1 of the timer is again closed and stays closed.

In the meantime, as control relay 4CR is energized, its contacts 4CR-1, 4CR-2, 4CR-3 and 4CR-4 are closed. Closure of contact 4CR-1 will apply power to the motor MOT-4TR of the pulsating timer 4TR which is designed to periodically close contacts 4TR-1A through 4TR-10A, inclusive, and then to close contacts 4TR-1B through 4TR-10B, inclusive, at a rate, in the preferred embodiment, of either two times per second, i.e., contacts 4TR-1A through 4TR-10A, inclusive, and 4TR-1B through 4TR-10B, inclusive, are each closed four times per second and opened four times per second.

Motor MOT-9 is energized to rotate the xerographic drum 10 through the associated drive mechanism previously described.

The paper wind-up motor MOT-1 is energized to drive the paper take-up roll through the paper clutch SC-3 which is also energized at this time. To maintain the proper tension on the web of paper or other support material, the variacs T-1 and T-2 are energized to control the power delivered to the paper brake SB-2 and paper clutch SC-3, conventional full wave rectifiers consisting of rectifiers SR-1 to SR-4, and SR-5 to SR-8, inclusive, being used to provide suitable direct current (D.C.) power to paper brake and paper clutch, respectively.

In order to advance the film, the valve SV-6 is energized upon closure of contact 4CR-1 to open the valve to allow flow of presurized aeriform fluid to the air cylinder 48 to advance the roller carriage 44 by actuation of the air cylinder toward the xerographic drum to force pressure roller 25 into contact with the drum and the film sandwiched therebetween, whereby the film is advanced by friction contact with the drum surface. Proper tension on the web of film is mantained as the variacs T-3 and T-4 are energized at the same time to control the power delivered to the film brake SB-4 and film clutch SC-5 through the conventional full wave rectifiers consisting of rectifiers SR-9 to SR-12 and SR-13 to SR-16, inclusive, whereby controlled direct current (D.C.) power is used to energize the film brake and film clutch, respectively.

The motor MOT-11 of the powder cloud generator drive assembly is also energized to effect operation of the powder cloud generators through their respective drive clutches as controlled by sequence-of-events timer 3TR. The motors MOT-12, MOT-13, MOT-14, MOT-15 and MOT-16, driving the blowers on the dust hoods 182, are energized at this time and remain in operation until the print-off button or switch SW-3 is closed as described.

Discharge lamp LMP-3, a conventional fluorescent lamp, is also energized through its conventional starter SW-9 and ballast L-1 circuit to discharge any residual electrostatic charge remaining on the drum as it passes beneath the discharge lamp.

The normally closed main air valve SV-1 is energized to permit the flow of low pressure aeriform fluid through the 20-pound per square inch line. The normally open blow-down valves SV-62, SV-63, SV-64, SV-65 and SV-66 are also energized and remain energized until the switch SW-3 is closed when these valves are again opened to let pressurized aeriform to be exhausted from the powder cloud generators through exhaust conduit 104.

As contact 4CR-2 is closed, power is applied to the high voltage power supply PS-2 to energize the corona generating device 15 and to apply a bias potential to the development electrodes, as described in detail hereinafter.

Upon closure of contact 4CR-4, the motors MOT-5 and MOT-6 are energized to drive the brushes 272 of the brush cleaner assemblies, and power is applied to a conventional voltage stabilizer unit, designated T-6 to provide a regulated power supply to the projection lamp LMP-2, and the motor MOT-7 to drive the blower 73.

To permit the powder cloud to be delivered from the powder cloud generators to their respective development electrodes the pinch valves 172 must be open. To open the pinch valves 172 the solenoids SOL-10, SOL-21, SOL-32, SOL-43, and SOL-54 are energized through the normally closed contacts 3TR-3B, 3TR-9B, 3TR-15B, 3TR-21B, and 3TR-27B and the closed contact 4CR-3 of control relay 4CR.

At the same time that contact 4CR-3 is closed, the generator pressure valves SV-15, SV-26, SV-37, SV-48 and SV-59 are energized through closed contacts 3TR-7, 3TR-13, 3TR-19, 3TR-25 and 3TR-31, as controlled by timer 3TR, to allow pressurized aeriform fluid from the 20-pound per square inch line to flow to the powder cloud generators, wherein an aerosol of powder is developed to be delivered to the development electrodes for development of the electrostatic image on the xerographic drum.

As the sequences-of-events timer 3TR operates, its contact 3TR-27B opens to de-energize solenoid SOL–54 and at the same time contact 3TR–27A will close to energize solenoid SOL–55 whereby the pinch valve associated with development electrode E–5 is closed.

At the same time contact 3TR–26B is opened to de-energize the forward drive clutch SC–51 of the electrode drive assembly and to de-energize the power cloud generator drive clutch SC–53 associated with development electrode E–5, while contact 3TR–26A is closed to apply full power through the normally closed limit switch 20LS to the back drive clutch SC–52 whereby the development electrode E–5 is advanced to its purge position at the rear of the machine. As development electrode E–5 reaches its purge position it will contact the normally closed limit switch 20LS to cause it to open whereby reduced power is applied to the back drive clutch SC–52 through resistor R–11 so that this clutch is operated at reduced torque.

Contact 3TR–29 is then opened to de-energize the coupler slide valve SV–56 so that the conduit from the air cylinder 175 for development electrode E–5 is connected to the exhaust conduit whereby the male coupling 174B is uncoupled from the female coupling 174A.

Contact 3TR–30B is then opened to de-energize solenoid SOL–58 as contact 3TR–30A is closed to energize solenoid SOL–57 to shift the female coupling 174A to the left, as seen in FIG. 9a for electrode E–1, at which time contact 3TR–29 again closed to energize the coupler slide valve SV–56 to admit pressurized aeriform fluid to the air cylinder to force the male coupling 174B into engagement with the female coupling 174A.

As timer 3TR continues to operate, contact 3TR–31 is opened to de-energize the generator pressure valve SV–59 thereby disconnecting the 20-pound per square inch line from the powder cloud generator and connecting the 50-pound per square inch air line to the powder cloud generator for the purging cycle. Then as contact 3TR–28B is opened and contact 3TR–28A is closed, the circuit to the solenoid SOL–55 controlling the closing of the pinch valve associated with development electrode E–5 is controlled by the contact 4TR–5A of the purge cycling timer while the solenoid SOL–54 effecting the opening of the pinch valve is now controlled by the actuation of the contact 4TR–5B of the pure cycling timer which also controls the actuation of the electrode purge valve SV–60 and the ceramic needle purge valve SV–61. With this circuit now in operation, opening and closing of contacts 4TR–5A and 4TR–5B, as controlled by the purge cycling timer 4TR, will effect the energizing and de-energizing of these electrical elements at a rate of four times per second, respectively, whereby clean air is caused to pulsate through these valves to clean the development elements associated therewith.

After a short period of time to permit the powder-cloud carrying elements to be thoroughly cleaned, the contact 3TR–31 is again closed so that the generator pressure valve SV–59 is energized to disconnect the 50-pound per square inch line and to connect the 20-pound per square inch line to the powder cloud generator of development electrode E–5. Contact 3TR–28A is then opened to break the circuit through the alternately opened and closed contacts 4TR–5A and 4TR–5B, thus removing the control of operation of solenoid SOL–54 and SOL–55 and the operation of the valves SV–60 and SV–61 from the purge cycling timer 4TR and to allow the solenoid SOL–55 to be energized through contact 3TR–27A.

Coupler slide valve SV–56 is now be-energized by opening contact 3TR–29 to permit the air cylinder to be coupled to the exhaust conduit so that the male coupling 174B is uncoupled from the female coupling 174A. Contact 3TR–30A is then opened to de-energize solenoid SOL–57 and contact 3TR–30B is again closed to energize solenoid SOL–58 so that the female coupler 174A is again shifted to the right or developing position at which time the coupler slide valve SV–56 is again energized upon the closure of contact 3TR–29.

Contact 3TR–27A is then opened to de-energize solenoid SOL–55 and contact 3TR–27B is closed to energize solenoid SOL–54 to maintain the pinch valve in an open position. At the same time, contact 3TR–26A is also opened to de-energize the back drive clutch SC–52 and contact 3TR–26B is closed to energize the forward drive clutch SC–51 to advance the development electrode E–5 to its forward or developing position. As the development electrode E–5 reaches its forward position it will open the normally closed limit switch 19LS so that the power now applied to the forward drive clutch SC–51 is applied through resistor R–10 so that the clutch will operate at reduced torque. At the same time, the development electrode E–5 will close limit switch 18LS to energize the powder cloud generator drive clutch SC–53 to effect operation of the powder cloud generator associated with the development electrode E–5. This development electrode is now in operative position to aid in the development of the electrostatic latent images on the drum while development electrodes E–4, E–3, E–2 and E–1 are then sequentially moved to their purge positions as indicated on the sequence of operation chart.

The sequence of operation of the electrical system for movement of the development electrodes E–4, E–3, E–2 and E–1, in the order mentioned, from their forward or developing positions to their purge position and then back to their forward positions is identical to that of development electrode E–5, as readily determined by reference to the electrical wiring diagram and the sequence of operation chart.

This cyclical retirement of each development electrode for air-purging is repeated until the printing process is discontinued by the operator by actuation of print-off switch SD–3 or closure of either limit switch 1LS or limit switch 22LS.

Normally the machine is shut off by the operator upon closure of Print-Off switch SW–3. Closure of switch SW–3 will allow the control relay 5CR to be energized to close it sholding contact 5CR–A and to open its normally closed contact 5CR–B. As contact 5CR–B is opened the control relay 4CR is de-energized to open its contacts 4CR–1, 4CR–2, 4CR–3 and 4CR–4 and control relay 7CR is de-energized to open its contact 7CR–1. As these contacts are opened the machine is again brought into a stand-by condition in which the machine may either be actuated again to start a reproducing cycle or it may be shut off as described hereinafter.

At the same time that control relay 5CR is energized, a commercially available timer 2TR is energized to initiate a stand-by waiting period of, for example, 50 seconds, which allows the machine to continue operating until the reset cycle for timer 3TR is completed. That is, 50 seconds after timer 2TR is first energized, the normally closed timer delay contact 2TR–1 is caused to open to break the circuit to control relay 3CR to thereby cause its contacts 3CR-1, 3CR-2, 3CR-3 and 3CR-4 to be opened, thus breaking the circuits to the elements controlled thereby.

This will then leave only the thermostat THS-1 energized to control the energization of control relay 1CR which in turn effects the energization of the resistor R-1 of the heat fuser and indicator lamp LMP-1. The circuit to the thermostat THS-1 and therefore control relay 1CR, resistor R-1 and LMP-1 is broken when the operator opens the Power-On switch SW-1.

The follower 35 riding on the film supply roll is positioned to also actuate an end of film shut off limit switch 22LS (not shown except in the electrical circuit) and the follower 35 riding on the paper supply roll is positioned to actuate an end of paper shut off limit switch 1LS (not shown except in the electrical circuit) which will automatically turn off the machine when either the film supply or paper supply is expended. Since these limit switches are connected in parallel with Print-Off switch SW-3, they effect the same shut down sequence as described in relation to closure of switch SW-3 when either limit switch 22LS or 1LS is closed. These limit switches are used to shut off the machine when either the supply of film or paper becomes exhausted from their respective supply rolls.

Referring now to the circuit for charging the xerographic drum in preparation for exposure and the circuit to apply a bias potential to the development electrodes, a clearer understanding of the operation of the electrical controlling circuit can best be obtained by reference to the schematic wiring diagram of these elements shown in FIG. 11a and to copending Codichini application Serial No. 19,846 filed April 4, 1960.

The coronode wires W of the corona generating device 15 are connected by a suitable conductor in series with resistor R-20 to the positive output terminal of the high voltage power supply PS-2 which is fully energized upon the closure of contact 4CR-2, and the grid bar G of the corona generating device is connected to the negative terminal.

The primary of the multiple step-up transformer T-7 is connected to the source of alternating current through the circuit previously described. Opposite ends of the high voltage secondary winding of transformer T-7 are connected to the anodes of full-wave rectifier tube V-5. Rectifier tube V-5 in parallel with capacitor C-3 forms a rectifying circuit so that direct current is supplied to the voltage regulator tube V-7 and voltage regulator tube V-6 in series with resistor R-13. Tube V-7 is a voltage reference tube which supplies a reference voltage to the cathode of control tube V-8, for example, a high gain pentode. The output of control tube V-8 is applied to the screen S of the corona charging device 15.

The charging current is set to the value, as indicated on the charging current meter M-2 connected in parallel with resistors R-14 and R-16, depending on the particular print contrast desired, by adjustment of potentiometer R-24 and by resistors R-21, R-22 and R-23 selectively placed in series with each other by means of contrast control switch SW-5.

In operation, any change in current through resistors R-14 and R-16, as previously set, (charging current from the coronode wires to the xerographic plate) which are in parallel with capacitor C-4, produces a change in the applied voltage to the grid of control tube V-8. The result is a change in tube resistance which produces a change in screen potential.

Thus, at any setting of the contrast control switch SW-5 the charging current will remain the same irrespective of variations in line voltage, atmospheric pressure or any other variable that would ordinarily affect the charging current. The regulation of charging current is done by controlling the screen potential with the control tube V-8. A change in charging current will produce a change in grid cathode voltage and therefore in the potential at the plate of the control tube. For example, an increase in charging current produces an increase in the grid cathode voltage thereby lowering the plate potential of the control tube and therefore the screen potential. The lowering of the screen potential reduces the charging current to correct for the initial increase in the charging current.

A regulated power supply circuit is provided whereby a bias potential of approximately +225 volts is applied to the development electrodes. The primary of the multiple step-up transformer T-8 is connected in parallel with transformer T-7 to the source of alternating current. The secondary windings of transformer T-8 are connected through a conventional rectifier and control circuit whereby the desired bias potential, as set by rheostat R-27, is maintained uniformly on the development electrodes.

An electrometer 16 is used with a conventional amplifier to measure the initial drum potential prior to exposure. The electrometer 16 is a conventional rotating vane type electrometer driven by motor MOT-8 and the electrometer circuit is controlled by an electrometer control switch SW-8. A meter M-3 is mounted on the control panel on the left side of the machine to record the plate potential. The Read-Calibrate switch SW-6 is positioned in the calibrate position when calibrating the electrometer and in the Read position to measure the plate potential on meter M-3.

In the amplifier circuit shown, the circuit ground of the amplifier is maintained above the machine chasis ground by a predetermined reference voltage and the meter 3M-3 is set to read zero at this reference voltage. A range check switch SW-7 is provided on the control panel in the front of the machine to avoid any ambiguity in the reading of meter M-3, since this meter, for example, if set at a reference voltage of 200 volts, would indicate the same deflection if the output voltage recorded by the electrometer is either 190 volts or 210 volts. Switch SW-7, when depressed, reduces the above reference voltage by a small amount to enable the operator to determine by the direction of the deflection of the indicating needle of the meter whether the actual output voltage is 190 volts or 210 volts. Thus, for example, if the reference voltage is reduced to 195 volts when switch SW-7 is depressed and if the actuator reading is 190 volts then there would be a decrease in the amount of the deflection of the indicating needle. If the original reading is 210 volts the deflection of the indicating needle would increase if the reference voltage is reduced to 195 volts when switch SN-7 is depressed.

Switch SW-4 is a screen potential and transfer current selector switch by means of which the operator can place meter M-1 in the circuit with the corona transfer charging devices to determine the transfer potential and transfer current applied to the back of the web of paper.

A photovoltic cell PC-1 pick up with a capacitor C-6 and an indicating output meter M-6 is used to give an indication to the operator of the exposure control setting needed to properly expose the film to the photoconductive surface of the drum as shown in FIG. 11c.

With the arrangement of the elements in the control circuit as described herein, it is possible to make continuous tone reproductions of images on film through contact exposure onto a xerographic plate, and it is possible to make these continuous tone reproductions any degree of contrast as desired.

The contrast control system of the xerographic reproducing apparatus of the invention is based upon electrostatic principles. In essense, contrast control is accomplished by controlling plate charging and exposure conditions, and plate developing conditions. The available range of print contrast is equivalent to that of silver halide papers.

Reduced to its most simple terms, the contrast control system of the apparatus of the invention is based upon the fact that the contrast of the electrostatic latent image is related directly to the potential of the xerographic plate prior to exposure, with print contrast increasing with increased initial plate potential.

When, for example, print contrast equivalent to Number 4 (high contrast) paper is desired, the xerographic plate is charged to 330 volts. Then, the correct exposure of the film onto the xerographic plate is such that the highest potential remaining on the plate after the exposure is 225 volts. At the other extreme, for the softest contrast, an equivalent to Number 1 contrast paper, the plate is charged to 227 volts and after the correct exposure the highest potential remaining anywhere on the exposed surface of the xerographic plate is again 225 volts.

Each intermediate print contrast requires its specified initial plate charging voltage between 227 volts and 330 volts. In all cases the maximum post exposure voltage anywhere on the plate ideally should be a positive 225 volts. This voltage is equal to, and of the same polarity as, the bias potential applied to the development electrode. Therefore, the darkest area on the negative gives rise to a corresponding area on the plate with a post exposure potential of a positive 225 volts. The net field between this potential and the positive 225 volts development bias is zero, so that a print highlight is developed. A clear area on the negative is represented on the plate as a post exposure potential of zero. The sum of this and the positive 225 volts development bias is a positive 225 volts which gives maximum field and therefore developes maximum print density. The intermediate tones, of course, are developed by net potentials between the above extremes.

The controls and indicating meters by which print contrast is varied are again described as follows: The exposure control knob 71 through a suitable pulley mechanism 72 rotates a circular wedge 64 which is interposed in the path of light from exposure lamp LMP–2, and effectively makes an exposure range of two whole density steps approximately six and one-half doubles from minimum. The output meter of exposure mater M–6 indicates to the operator the relative average density of the film.

The four-position contrast control switch SW–5 is the basic contrast control element in the system and is used to vary plate charging potential. The value of the resistors R–21, R–22, and R–23 and the potentiometer R–24 are so selected and adjusted that in effect by merely turning to the switch SW–5 an operator can dial the contrast desired. In the example shown, the operator can dial any one of four desired contrast settings, that is contrast numbers 1, 2, and 3, 4 roughly corresponding to the contrast grades of silver halide paper. The resultant plate potentials, as obtained by placing these above-described resistors in the circuit by means of switch SW–5 would give the following plate potentials as read on charging current meter M–2 with the following equivalent contrast values:

Contrast No. 1 should read 227 volts.
Contrast No. 2 should read 240 volts.
Contrast No. 3 should read 270 volts.
Contrast No. 4 should read 330 volts.

While the invention has been described with reference to the structures disclosed herein, it is not confined to the specific details set forth, since it is apparent that many modifications and changes can be made by those skilled in the art. For example, the number of electrodes used in the machine may either be increased or decreased, depending on the size of the development electrodes themselves. This application is therefore intended to cover such modifications or changes as may come within the purposes of the improvements or scope of the following claims:

What is claimed is:
1. A xerographic contact printing apparatus including a xerographic plate mounted for rotation,
drive means connected to said xerographic plate for rotating said xerographic plate at a predetermined speed,
charging means positioned in closely spaced relation to said xerographic plate to place an electrostatic charge thereon,
control means connected to said charging means to vary the electrostatic charge applied to said xerographic plate,
a film supply spool,
a film take-up spool to receive film from said supply spool,
a first film positioning roll and a second film positioning roll mounted in spaced relation to each other adjacent said xerographic plate,
at least one of said film positioning rolls being mounted for movement from a first position in which a film may be inserted between said film positioning roll and said xerographic plate to a second position in which said film positioning roll is in pressure contact with said xerographic plate with a film sandwiched inbetween,
a first tensioning means connected to said film supply spool and a second tensioning means connected to said take-up spool for maintaining a web of film in frictional contact with said xerographic plate over a portion thereof for synchronous movement with said xerographic plate,
projector means positioned adjacent said xerographic plate, said projector means including a light source,
a light discharge tube positioned between said first film positioning roll and said second film positioning roll whereby light from said light source projected through said light discharge tube is directed onto a film while in contact with said xerographic plate to form an electrostatic latent image on said xerographic plate,
means connected to said light discharge tube to vary the amount of radiation projected through the film onto said xerographic plate,
developing means including development electrode means positioned adjacent said xerographic plate for developing an electrostatic latent image thereon, and
power means connected to said development electrode means to apply a controlled bias potential to said development electrode means.

2. A xerographic contact printing apparatus including a xerographic plate mounted for rotation,
a corona generating device mounted in closely spaced relation to said xerographic plate to place an electrostatic charge thereon,
a film supply spool to support a supply of film,
a film take-up spool to receive film from said supply spool,
a first film positioning roll and a second film positioning roll mounted in spaced relation to each other adjacent said xerographic plate,
at least said first film positioning roll being mounted for movement from a first position in which a film may be inserted between said first film positioning roll and said xerographic plate to a second position in which said first film supporting roll is in pressure contact with said xerographic plate with a film sandwiched inbetween whereby the film is guided into friction contact with said xerographic plate over a portion thereof for synchronous movement with said xerographic plate,
projector means positioned adjacent said xerographic plate,
said projector means including a light source and a light discharge tube positioned between said first film positioning roll and said second film positioning roll whereby light projected through said light discharge tube from the light source is directed onto the film while in contact with said xerographic plate to form an electrostatic latent image on said xerographic plate,
control means connected to said corona generating device for varying the electrostatic charge applied to said xerographic plate,
radiation control means operatively connected to said light discharge tube to vary the amount of light projected onto the film whereby variable contrast exposure of the film onto said xerographic plate can be made,
developing means including development electrode means positioned adjacent said xerographic plate for developing an electrostatic latent image thereon, and
power means connected to said development electrode means to apply a controlled bias potential to said development electrode means.

3. A xerographic contact printing apparatus including a xerographic plate mounted for rotation,
a corona generating device mounted in closely spaced relation to said xerographic plate to place an electrostatic charge thereon,
a film supply spool to support a supply of film,
a film take-up spool to receive film from said supply spool,
a first film positioning roll and a second film positioning roll mounted in spaced relation to each other adjacent said xerographic plate,
at least said first film positioning roll being mounted for movement from a first position in which a film may be inserted between said first film positioning roll and said xerographic plate to a second position in which said first film supporting roll is in pressure contact with said xerographic plate with a film sandwiched inbetween whereby the film is guided into friction contact with said xerographic plate over a portion thereof for synchronous movement with said xerographic plate,
projector means positioned adjacent said xerographic plate, said projector means including a light source and a light discharge tube positioned between said first film positioning roll and said second film positioning roll whereby light projected through said light discharge tube from said light source is directed through the film while in contact with said xerographic plate to form an electrostatic latent image on said xerographic plate,
developing means including development electrode means positioned adjacent said xerographic plate for developing an electrostatic latent image thereon, and
power means connected to said development electrode means to apply a controlled bias potential to said development electrode means.

4. A xerographic contact printing apparatus including a xerographic plate mounted for rotation,
charging means positioned in closely spaced relation to said xerographic plate to place an electrostatic charge thereon,
control means connected to said charging means to vary the electrostatic charge applied to said xerographic plate,
a film supply spool,
a film take-up spool to receive film from said supply spool,
a first film positioning roll and a second film positioning roll mounted in spaced relation to each other adjacent said xerographic plate,
at least one of said film positioning rolls being mounted for movement from a first position in which a film may be inserted between said film positioning roll and said xerographic plate to a second position in which said film supporting roll is in pressure contact with said xerographic plate with a film sandwiched in between whereby the film is guided into peripheral contact with said xerographic plate over a portion thereof for synchronous movement with said xerographic plate,
projector means positioned adjacent said xerographic plate,
said projector means including a light discharge tube positioned between said first film positioning roll and said second film positioning roll whereby light projected through said light discharge tube is directed through the film while in contact with said xerographic plate to form an electrostatic latent image on said xerographic plate,
means to vary the amount of radiation projected through the film onto said xerographic plate,
developing means including development electrode means positioned adjacent said xerographic plate for developing an electrostatic latent image thereon, and
power means connected to said development electrode means to apply a controlled bias potential to said development electrode means.

References Cited in the file of this patent
UNITED STATES PATENTS

| | | |
|---|---|---|
| 2,357,809 | Carlson | Sept. 12, 1944 |
| 2,824,813 | Fauser | Feb. 25, 1958 |
| 2,956,487 | Giaimo | Oct. 18, 1960 |